US012795359B2

(12) United States Patent
Elshafie et al.

(10) Patent No.: US 12,795,359 B2
(45) Date of Patent: Nov. 10, 2026

(54) TECHNIQUES FOR DATA AUTHENTICATION IN WIRELESS COMMUNICATIONS SYSTEMS

(71) Applicant: QUALCOMM INCORPORATED, San Diego, CA (US)

(72) Inventors: Ahmed Elshafie, San Diego, CA (US); Alexandros Manolakos, Athens (GR); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 18/721,822

(22) PCT Filed: Feb. 7, 2023

(86) PCT No.: PCT/US2023/062113
§ 371 (c)(1),
(2) Date: Jun. 19, 2024

(87) PCT Pub. No.: WO2023/158944
PCT Pub. Date: Aug. 24, 2023

(65) Prior Publication Data

US 2025/0063353 A1 Feb. 20, 2025

(30) Foreign Application Priority Data

Feb. 16, 2022 (GR) ................................ 0220100142
Mar. 1, 2022 (GR) ................................ 0220100187

(51) Int. Cl.
*G06F 7/04* (2006.01)
*H04L 9/32* (2006.01)
*H04W 12/06* (2021.01)

(52) U.S. Cl.
CPC ............... *H04W 12/06* (2013.01); *H04L 9/32* (2013.01)

(58) Field of Classification Search
CPC ....... H04L 9/0819; H04L 9/0825; H04L 9/32; G06F 21/606; H04W 12/06
See application file for complete search history.

(56) References Cited

U.S. PATENT DOCUMENTS 12,028,714 B1 * 7/2024 Gutt ........................ G01S 19/05
2004/0242201 A1 * 12/2004 Sasakura ............. H04W 12/082 455/410

(Continued)

OTHER PUBLICATIONS

Suomalainen et al., Security Pairings Using Physical Layer Properties of Wireless Communications, May 14, 2014, IEEE, pp. 1-8. (Year: 2014).*

(Continued)

*Primary Examiner* — Philip J Chea
*Assistant Examiner* — Jenise E Jackson
(74) *Attorney, Agent, or Firm* — Holland & Hart LLP

(57) ABSTRACT

Methods, systems, and devices for wireless communications are described. The techniques described herein may support authentication schemes for wireless communications. A first wireless device may communicate one or more messages associated with an authentication scheme with a second wireless device. The one or more messages may indicate a capability of one or more of the devices, that the authentication scheme includes a symmetric or an asymmetric authentication scheme, or both. The first wireless device may receive a signal from the second wireless device. The signal may include a set of authentication bits. The first wireless device may determine an authenticity of the signal based on the set of authentication bits, the signal, at least one key associated with the authentication scheme, or a combination thereof. The authenticity may indicate whether the signal was sent from the second wireless device or another wireless device.

29 Claims, 21 Drawing Sheets

(56) References Cited

U.S. PATENT DOCUMENTS

| | | | | |
|---|---|---|---|---|
| 2012/0008783 | A1 | 1/2012 | Montenegro | |
| 2017/0019251 | A1* | 1/2017 | Jain | H04L 9/12 |
| 2019/0074973 | A1* | 3/2019 | Hadaschik | G07C 9/00309 |
| 2019/0342105 | A1* | 11/2019 | Adams | H04L 9/0822 |
| 2020/0358613 | A1* | 11/2020 | Bryant | H04L 9/3228 |
| 2021/0192023 | A1* | 6/2021 | Bryant | H04L 9/3228 |

OTHER PUBLICATIONS

Shim, Basis: A Practical Multi-User Broadcast Authentication Scheme in Wireless Sensor Networks, Feb. 13, 2017, pp. 1545-1554. (Year: 2017).*

ETSI TS 133 303: "Universal Mobile Telecommunications System (UMTS), LTE, Proximity-Based Services (ProSe), Security Aspects (3GPP TS 33.303 version 13.4.0 Release 13)", Technical Specification, European Telecommunications Standards Institute (ETSI), 650, Route Des Lucioles, F-06921 S, Sophia-Antipolis, France, vol. 3GPP SA, No. V13.4.0, Aug. 23, 2016, pp. 1-90, XP014280249, Fig. 6.5.5.2-1.

International Search Report and Written Opinion—PCT/US2023/062113—ISA/EPO—May 24, 2023.

Melki R., et al., "Message Authentication Algorithm for OFDM Communication Systems", Telecommunication Systems, vol. 76, No. 3, Oct. 6, 2020, 20 Pages, XP037378959, pp. 403-422, Sections 1-7.

* cited by examiner

TECHNIQUES FOR DATA AUTHENTICATION IN WIRELESS COMMUNICATIONS SYSTEMS

CROSS REFERENCE

The present application is a 371 national stage filing of International PCT Application No. PCT/US2023/062113 by Elshafie et al. entitled "TECHNIQUES FOR DATA AUTHENTICATION IN WIRELESS COMMUNICATIONS SYSTEMS," filed Feb. 7, 2023; and claims priority to Greek patent application No. 20220100187 by Elshafie et al. entitled "TECHNIQUES FOR DATA AUTHENTICATION IN WIRELESS COMMUNICATIONS SYSTEMS," filed Mar. 1, 2022, and Greek patent application No. 20220100142 by Elshafie et al., entitled "TECHNIQUES FOR DATA AUTHENTICATION IN WIRELESS COMMUNICATIONS SYSTEMS," filed Feb. 16, 2022, each of which is assigned to the assignee hereof, and each of which is expressly incorporated by reference in its entirety herein.

FIELD OF TECHNOLOGY

The following relates to wireless communications, including techniques for data authentication in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support communications via various layers and channels between devices. However, conventional systems may be relatively insecure. For example, the devices may be susceptible to attacks, interference, and the like from attacker devices, which may result in decreased battery life, inefficient communications, or both.

SUMMARY

The described techniques relate to improved methods, systems, devices, and apparatuses that support techniques for data authentication in wireless communications systems. Generally, the described techniques provide for signatures in communications between wireless devices, which may enable the wireless devices to authenticate the communications. For example, an authorized transmitting device may include a set of authentication bits (e.g., signature bits) in a signal transmitted to a receiving device. The receiving device may receive the signal and generate a set of bits (e.g., signature bits) using the signal. The receiving device may compare the generated set of bits to the set of authentication bits and determine an authenticity of the signal based on the comparison. For example, if the generated set of bits match the set of authentication bits, the receiving device may determine that the signal was transmitted from an authorized transmitting device. Alternatively, if the generated set of bits do not match the set of authentication bits, or if a received signal does not include the set of authentication bits, the receiving device may determine that the signal was transmitted from another device (e.g., a non-authorized device, an attacker device).

In some examples, the signature bits may be generated based on an authentication scheme. For example, the devices may be configured with a symmetric authentication scheme, an asymmetric authentication scheme, or a combination thereof. The devices may generate the signature bits using one or more keys associated with a respective authentication scheme. In some examples, implementing the authentication techniques described herein may result in improved security and reliability of communications, reduced power consumption due to attacks from unauthorized devices, among other benefits.

A method for wireless communications at a first wireless device is described. The method may include communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both, receiving a signal via a set of resources associated with the authentication scheme, and performing an authentication procedure on the signal to determine an authenticity of the signal based on at least one key associated with the authentication scheme and a set of bits generated based on the authentication scheme, where the authenticity indicates whether the signal is from the second wireless device or another wireless device.

An apparatus for wireless communications at a first wireless device is described. The apparatus may include a processor, memory coupled with the processor, and instructions stored in the memory. The instructions may be executable by the processor to cause the apparatus to communicate one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both, receive a signal via a set of resources associated with the authentication scheme, and perform an authentication procedure on the signal to determine an authenticity of the signal based on at least one key associated with the authentication scheme and a set of bits generated based on the authentication scheme, where the authenticity indicates whether the signal is from the second wireless device or another wireless device.

Another apparatus for wireless communications at a first wireless device is described. The apparatus may include means for communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both, means for receiving a signal via a set of resources associated with the authentication scheme, and means for performing an authentication procedure on the signal to determine an authenticity of the signal based on at least one key associated with the authentication scheme and a set of bits generated based on the authentication scheme, where the authenticity indicates whether the signal is from the second wireless device or another wireless device.

A non-transitory computer-readable medium storing code for wireless communications at a first wireless device is described. The code may include instructions executable by a processor to communicate one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both, receive a signal via a set of resources associated with the authentication scheme, and perform an authentication procedure on the signal to determine an authenticity of the signal based on at least one key associated with the authentication scheme and a set of bits generated based on the authentication scheme, where the authenticity indicates whether the signal is from the second wireless device or another wireless device.

In some examples of the method, apparatuses, and non-transitory computer-readable medium described herein, the authentication scheme includes the asymmetric authentication scheme. Some examples of the method, apparatuses, and non-transitory computer-readable medium described herein may further include operations, features, means, or instructions for receiving, from the second wireless device, an indication of a public key of the at least one key, and determining the authenticity of the signal using the public key, the set of bits generated using a private key of the at least one key, the signal, or any combination thereof.

In some examples of the method, apparatuses, and non-transitory computer-readable medium described herein, communicating the one or more messages may include operations, features, means, or instructions for transmitting a capability message indicating the capability of the first wireless device and receiving, from the second wireless device, a message indicating that the authentication scheme includes one of the symmetric authentication scheme or the asymmetric authentication scheme based on the capability of the first wireless device, the capability of the second wireless device, or both.

Some examples of the method, apparatuses, and non-transitory computer-readable medium described herein may further include operations, features, means, or instructions for estimating a channel associated with the set of resources to obtain a channel metric and deriving the at least one key associated with the authentication scheme based on the channel metric.

Some examples of the method, apparatuses, and non-transitory computer-readable medium described herein may further include operations, features, means, or instructions for generating the at least one key based on the authentication scheme, where the at least one key includes a public key and a private key based on the authentication scheme being the asymmetric authentication scheme and communicating a message indicating the at least one key with the second wireless device.

In some examples of the method, apparatuses, and non-transitory computer-readable medium described herein, communicating the one or more messages may include operations, features, means, or instructions for receiving a message from the second wireless device configuring the authentication scheme for one or more resource pools, where the set of resources includes a subset of the one or more resource pools.

In some examples of the method, apparatuses, and non-transitory computer-readable medium described herein, performing the authentication procedure may include operations, features, means, or instructions for generating the set of bits using the at least one key associated with the authentication scheme and using the signal, comparing the generated set of bits to a set of authentication bits included in the signal, and determining the authenticity of the signal based on the comparison.

In some examples of the method, apparatuses, and non-transitory computer-readable medium described herein, the set of authentication bits may be based on a mode of operation and a size of the set of authentication bits corresponds to the mode of operation, a security level indicated by the one or more messages, or any combination thereof.

In some examples of the method, apparatuses, and non-transitory computer-readable medium described herein, the set of authentication bits, the generated set of bits, or both may be based on one or more code blocks of the signal, one or more error detection bits of the signal, one or more identifiers, or any combination thereof.

Some examples of the method, apparatuses, and non-transitory computer-readable medium described herein may further include operations, features, means, or instructions for communicating a message indicating the at least one key associated with the authentication scheme.

In some examples of the method, apparatuses, and non-transitory computer-readable medium described herein, communicating the message may include operations, features, means, or instructions for communicating the message indicating the at least one key via layer 1 signaling, layer 2 signaling, layer 3 signaling, or any combination thereof.

In some examples of the method, apparatuses, and non-transitory computer-readable medium described herein, communicating the message may include operations, features, means, or instructions for communicating the message via a secure channel.

In some examples of the method, apparatuses, and non-transitory computer-readable medium described herein, a set of authentication bits included in the signal may be jointly encoded with one or more code blocks and error detection bits of the signal and the set of authentication bits included in the signal may be appended to encoded bits of the signal, the encoded bits indicating the one or more code blocks, the error detection bits, or a combination thereof.

In some examples of the method, apparatuses, and non-transitory computer-readable medium described herein, a set of authentication bits included in the signal corresponds to a group of code blocks of the signal.

Some examples of the method, apparatuses, and non-transitory computer-readable medium described herein may further include operations, features, means, or instructions for communicating a set of signals prior to receiving the signal, where the set of bits may be generated based on successful decoding of the set of signals.

Some examples of the method, apparatuses, and non-transitory computer-readable medium described herein may further include operations, features, means, or instructions for receiving an indication of a set of code blocks or a set of transport blocks of the set of signals, where the set of bits may be generated based on the indication and selecting the set of code blocks or the set of transport blocks of the set of signals based on the at least one key, where the set of bits may be generated based on the selecting.

A method for wireless communications at a second wireless device is described. The method may include communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both and transmitting a signal via a set of resources associated with the authentication scheme, the signal including a set of authentication bits generated based on the authentication scheme and at least one key associated with the authentication scheme.

An apparatus for wireless communications at a second wireless device is described. The apparatus may include a processor, memory coupled with the processor, and instructions stored in the memory. The instructions may be executable by the processor to cause the apparatus to communicate one or more messages associated with an authentication scheme for communications with a first wireless device, the authentication scheme including one of a symmetric authentication scheme or an asymmetric authentication scheme based on a capability of the first wireless device, a second capability of the second wireless device, or both and transmit a signal via a set of resources associated with the authentication scheme, the signal including a set of authentication bits generated based on the authentication scheme and at least one key associated with the authentication scheme.

Another apparatus for wireless communications at a second wireless device is described. The apparatus may include means for communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both and means for transmitting a signal via a set of resources associated with the authentication scheme, the signal including a set of authentication bits generated based on the authentication scheme and at least one key associated with the authentication scheme.

A non-transitory computer-readable medium storing code for wireless communications at a second wireless device is described. The code may include instructions executable by a processor to communicate one or more messages associated with an authentication scheme for communications with a first wireless device, the authentication scheme including one of a symmetric authentication scheme or an asymmetric authentication scheme based on a capability of the first wireless device, a second capability of the second wireless device, or both and transmit a signal via a set of resources associated with the authentication scheme, the signal including a set of authentication bits generated based on the authentication scheme and at least one key associated with the authentication scheme.

In some examples of the method, apparatuses, and non-transitory computer-readable medium described herein, the authentication scheme includes the asymmetric authentication scheme. Some examples of the method, apparatuses, and non-transitory computer-readable medium described herein may further include operations, features, means, or instructions for generating a public key and a private key of the at least one key associated with the authentication scheme, transmitting, to the first wireless device, an indication of the public key, and generating the set of authentication bits using the private key, where the set of authentication bits are verifiable using the public key.

In some examples of the method, apparatuses, and non-transitory computer-readable medium described herein, communicating the one or more messages may include operations, features, means, or instructions for receiving a capability message indicating the capability of the first wireless device and transmitting, to the second wireless device, a message indicating that the authentication scheme includes one of the symmetric authentication scheme or the asymmetric authentication scheme based on the capability of the first wireless device, the capability of the second wireless device, or both.

Some examples of the method, apparatuses, and non-transitory computer-readable medium described herein may further include operations, features, means, or instructions for estimating a channel associated with the set of resources to obtain a channel metric and deriving the at least one key associated with the authentication scheme based on the channel metric.

Some examples of the method, apparatuses, and non-transitory computer-readable medium described herein may further include operations, features, means, or instructions for communicating a message indicating the at least one key with the first wireless device, where the at least one key includes a public key and a private key based on the authentication scheme being the asymmetric authentication scheme.

In some examples of the method, apparatuses, and non-transitory computer-readable medium described herein, communicating the one or more messages may include operations, features, means, or instructions for transmitting a message to the first wireless device configuring the authentication scheme for one or more resource pools, where the set of resources include a subset of the one or more resource pools.

Some examples of the method, apparatuses, and non-transitory computer-readable medium described herein may further include operations, features, means, or instructions for generating the set of authentication bits using the at least one key associated with the authentication scheme and using the signal, where the set of authentication bits may be based on a mode of operation, a security level indicated by the one or more messages, one or more code blocks of the signal, one or more error detection bits of the signal, one or more identifiers, or any combination thereof.

In some examples of the method, apparatuses, and non-transitory computer-readable medium described herein, jointly encoding the set of authentication bits with one or more code blocks and error detection bits of the signal and appending the set of authentication bits to encoded bits of the signal, the encoded bits indicating the one or more code blocks and the error detection bits.

Some examples of the method, apparatuses, and non-transitory computer-readable medium described herein may further include operations, features, means, or instructions for communicating a set of signals prior to receiving the signal, where the set of authentication bits may be generated based on successful decoding of the set of signals.

Some examples of the method, apparatuses, and non-transitory computer-readable medium described herein may further include operations, features, means, or instructions for receiving an indication of a set of code blocks or a set of transport blocks of the set of signals, where the set of authentication bits may be generated based on the indication and selecting the set of code blocks or the set of transport blocks of the set of signals based on the at least one key, where the set of authentication bits may be generated based on the selecting.

Some examples of the method, apparatuses, and non-transitory computer-readable medium described herein may further include operations, features, means, or instructions for communicating a message indicating the at least one key associated with the authentication scheme.

In some examples of the method, apparatuses, and non-transitory computer-readable medium described herein, communicating the message may include operations, features, means, or instructions for communicating the message indicating the at least one key via layer 1 signaling, layer 2 signaling, layer 3 signaling, or any combination thereof.

In some examples of the method, apparatuses, and non-transitory computer-readable medium described herein, communicating the message may include operations, features, means, or instructions for communicating the message via a secure channel.

DETAILED DESCRIPTION

Figure 1:
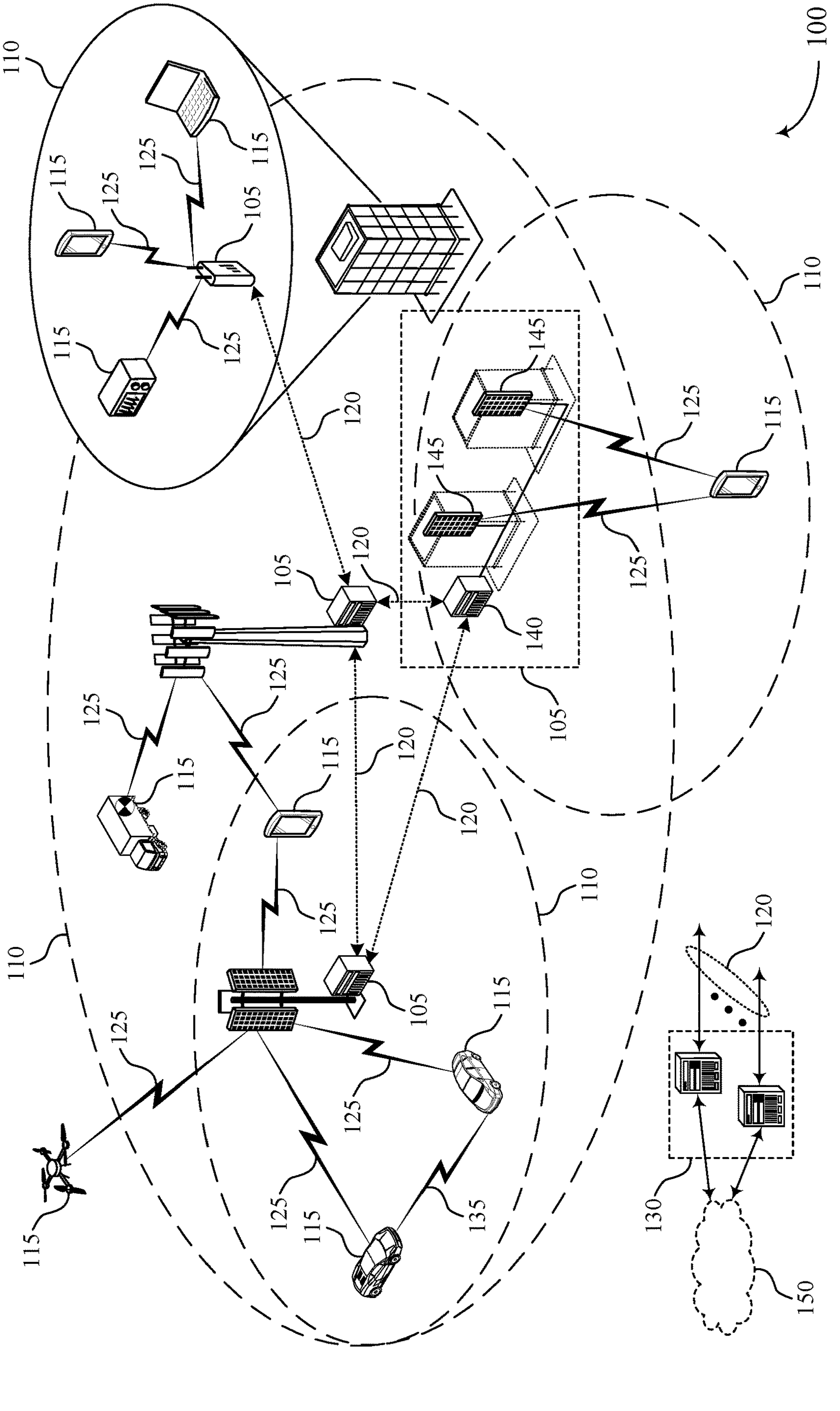
FIG. 1 illustrates an example of a wireless communications system that supports techniques for data authentication in wireless communications systems in accordance with aspects of the present disclosure.

Some wireless communications systems may support communications via various signaling and channels. For example, wireless devices may communicate signals via relatively secure channels (e.g., layer 3 (L3) signaling such as radio resource control (RRC) signaling). Additionally or alternatively, the wireless device may communicate signals via relatively less secure channels (e.g., downlink control information (DCI), uplink control information (UCI), sidelink control information (SCI), medium access control (MAC) control element (CE), and the like). Techniques to improve security and authentication in wireless communications systems may be desired. For example, some communications may be susceptible to attacks, interference, or interception from attacking devices. As one illustrative example, an attacker device may transmit wake up signals or service requests to a target device (e.g., a receiving device), which may result in the target device waking up and monitoring for communications from an authorized device (e.g., the target device may be unable to differentiate between a wake up signal from an authorized device and an attacker device). Thus, the attacker device may continually waken a target device to drain their battery, limit their activity on other tasks (e.g., the target device may unnecessarily monitor for communications based on receiving a service request from the attacker device), or both, among other examples of malicious activity (e.g., interference and interception of communications).

Accordingly, devices in a wireless communications system may implement the techniques described herein, which may improve the security and reliability of communications, improve battery life, or both, among other benefits. For example, an authorized transmitting device may include a signature (e.g., a set of authentication bits) in a signal transmitted to a receiving device. Such a signature may enable a receiving device to determine an authenticity of the signal (e.g., the receiving device may be able to verify whether the signal was sent from the authorized transmitting device or from another device, such as an attacker device). For example, the receiving device may receive the signal and generate a set of bits (e.g., signature bits) using the signal. The receiving device may compare the generated set of bits to the set of authentication bits included in the signal. In some examples, if the generated set of bits match the set of authentication bits, the receiving device may determine that the signal was transmitted from the authorized transmitting device. In some other examples, if the generated set of bits fail to match the set of authentication bits, or if a received signal does not include the set of authentication bits, the receiving device may determine that the signal was transmitted from another device (e.g., an attacker device).

The signature may be generated by the receiving device, the transmitting device, or both, in accordance with one or more authentication schemes. For example, the signature may be generated using one or more keys of a respective authentication scheme. In some examples, the authentication scheme may be an example of a symmetric authentication scheme (e.g., the receiving device and the transmitting device may have a same key used to generate or authenticate the signature bits). Additionally or alternatively, the authentication scheme may be an example of an asymmetric authentication scheme (e.g., the transmitting device may generate the signature bits with a private key and the receiving device may generate or authenticate the signature bits with a public key). In some examples, the authentication scheme may be implemented in conjunction with a commitment scheme as described herein. In some examples, the signature bits may be based on the one or more keys associated with the authentication scheme, the associated signal (e.g., the bits, code blocks, transport blocks, and the like of a message may be used to generate the signature) one or more error correction bits associated with the signal, one or more identifiers (e.g., an RRC configured security or scrambling identifier (ID)), or any combination thereof.

In some examples, the devices may communicate one or more messages associated with the authentication scheme. For example, the devices may communicate capability messages (e.g., the receiver device may indicate a capability to support one or more schemes), the devices may agree on or otherwise indicate an authentication scheme to use from a set of authentication schemes (e.g., a device may be configured to use a symmetric scheme or an asymmetric scheme, for example, based on a capability of the device), or a combination thereof. In some examples, the one or more messages may indicate one or more keys. For example, a device may generate or identify a key and indicate the key to other authorized devices (e.g., a transmitting device may generate public and private keys and send the public key in layer 1 (L1), layer 2 (L2), or layer 3 L3) signaling). In some examples, the devices may be configured to obtain keys for generating or validating the signature from information known to the authorized devices (e.g., the devices may generate keys from channel estimation metrics, and an attacker device may be unable to generate the same key due to differences in the channel between the authorized devices and the channel experienced at the attacker device).

Aspects of the disclosure are initially described in the context of wireless communications systems. Aspects of the disclosure are then described in the context of authentication schemes, signals, encoding schemes, and process flows. Aspects of the disclosure are further illustrated by and described with reference to apparatus diagrams, system diagrams, and flowcharts that relate to techniques for data authentication in wireless communications systems.

FIG. 1 illustrates an example of a wireless communications system 100 that supports techniques for data authentication in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, the base stations 105 may additionally or alternatively be referred to as network entities 105. Stated alternatively, a wireless device herein may be an example of a network entity 105 (e.g., a base station 105, a UE 115). As an illustrative example, the wireless communications system 100 may support a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), a distributed unit (DU), a radio unit (RU), a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. An RU may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU, a DU, and an RU is flexible and may support different functionalities depending upon which functions (e.g., network layer functions, protocol layer functions, baseband functions, RF functions, and any combinations thereof) are performed at a CU, a DU, or an RU. For example, a functional split of a protocol stack may be employed between a CU and a DU such that the CU may support one or more layers of the protocol stack and the DU may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU. Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some cases, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU). A CU may be functionally split further into CU control plane (CU-CP) and CU user plane (CU-UP) functions. A CU may be connected to one or more DUs via a midhaul communication link (e.g., F1, F1-c, F1-u), and a DU may be connected to one or more RUs via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network). In some cases, in an IAB network, one or more network entities 105 may be partially controlled by each other. One or more IAB nodes may be referred to as a donor entity or an IAB donor. One or more DUs or one or more RUs may be partially controlled by one or more CUs associated with a donor network entity 105 (e.g., a donor base station 105). The one or more donor network entities 105 (e.g., IAB donors) may be in communication with one or more additional network entities 105 (e.g., IAB nodes) via supported access and backhaul links (e.g., backhaul communication links 120). IAB nodes may include an IAB mobile termination (IAB-MT) controlled (e.g., scheduled) by DUs of a coupled IAB donor. An IAB-MT may include an independent set of antennas for relay of communications with UEs 115, or may share the same antennas (e.g., of an RU) of an IAB node used for access via the DU of the IAB node (e.g., referred to as virtual IAB-MT (vIAB-MT)). In some examples, the IAB nodes may include DUs that support communication links with additional entities (e.g., network entities 105, UEs 115) within the relay chain or configuration of the access network (e.g., downstream). In such cases, one or more components of the disaggregated RAN architecture (e.g., one or more IAB nodes or components of IAB nodes) may be configured to operate according to the techniques described herein.

The wireless communications system 100 may support techniques for data authentication as described herein. For example, devices in the wireless communications system 100 may use signatures for communications, which may enable the wireless devices to authenticate the communications. For example, an authorized transmitting device (e.g., a network entity 105, a UE 115, or any other wireless communications device) may include a set of authentication bits (e.g., signature bits) in a signal transmitted to a receiving device (e.g., a network entity 105, a UE 115, or any other wireless communications device). The receiving device may receive the signal and authenticate the set of bits using the signal. For example, the receiving device may generate a set of bits (e.g., signature bits) using the signal. The receiving device may compare the generated set of bits to the set of authentication bits. The receiving device may determine an authenticity of the signal based on the comparison. Additionally or alternatively, the receiving device may use one or more keys (e.g., a public key) to verify the authenticity of the signal by checking the set of authentication bits (e.g., the signature bits that were generated using a private key).

Figure 2:
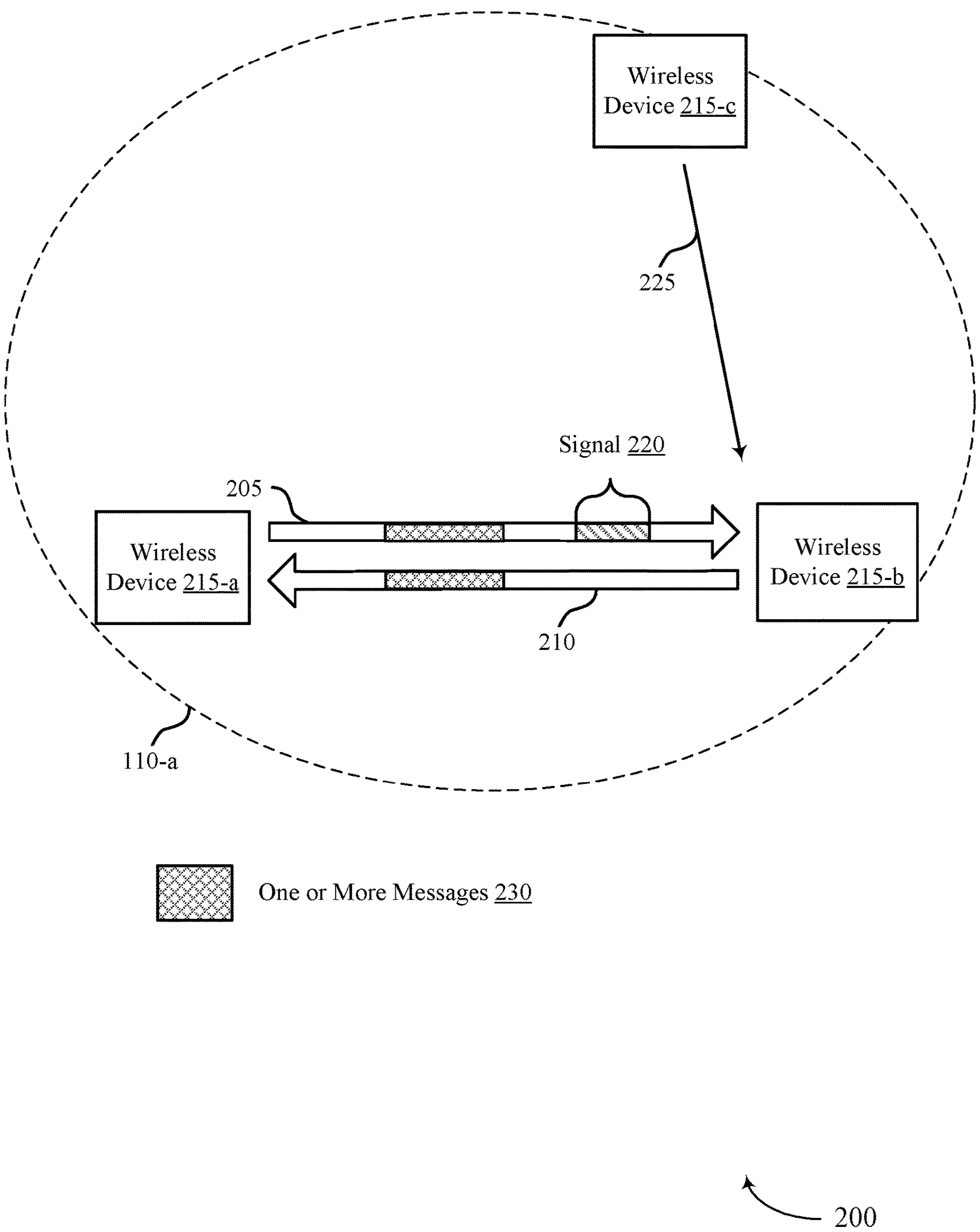
FIG. 2 illustrates an example of a wireless communications system that supports techniques for data authentication in wireless communications systems in accordance with aspects of the present disclosure.

FIG. 2 illustrates an example of a wireless communications system 200 that supports techniques for data authentication in wireless communications systems in accordance with aspects of the present disclosure. In some examples, wireless communications system 200 may implement or be implemented by aspects of wireless communications system 100. For example, the wireless communications system 200 may include wireless devices 215-*a*, 215-*b*, and 215-*c*, which may be examples of UEs 115, network entities 105, or a combination thereof as described with reference to FIG. 1. While the example of wireless communications system 200 includes the wireless device 215-*a* as a transmitting device, the wireless device 215-*b* as a receiving device, and the wireless device 215-*c* as an attacker device, it is to be understood that any type or quantity of wireless devices may be used. Further, operations described as being performed by the wireless device 215-*a* may additionally or alternatively be performed by the wireless device 215-*b*, and vice versa.

The wireless device 215-*b* may communicate with the wireless device 215-*a* in a geographic coverage area 110-*a*. For example, the geographic coverage area 110-*a* may be supported by the wireless device 215-*a* (e.g., the wireless device 215-*a* may be an example of a network entity 105). In some examples, the wireless device 215-*a* may transmit one or more signals to the wireless device 215-*b* via a communications link 205 (e.g., a downlink communications link or a sidelink communications link) and the wireless device 215-*b* may transmit one or more signals to the wireless device 215-*a* via a communications link 210 (e.g., an uplink communications link or a sidelink communications link).

The wireless communications system 200 may support communications via channels and signaling with various levels of security. For example, some signaling may be an example of protected signaling over secured channels (e.g., secure signaling), such as L3 signaling (e.g., RRC or user plane data in a connected mode may be communicated via a dedicated control channel (DCCH)). Additionally or alternatively, some signaling may be an example of unprotected signaling over relatively unsecured channels (e.g., unsecure signaling), such as some L1 signaling (e.g., physical layer signaling), L2 signaling (e.g., control or header layer signaling), and/or L3 signaling in idle or inactive modes, transition modes, connected modes or any combination thereof. As an illustrative example, communications may be unprotected when transmitted via MAC-CE, control protocol data unit (PDU), RLC, MAC, PDCP, RLC, DCI, PUCCH, DCI, paging, system information, common control channel (CCCH), or any combination thereof. In some examples, secure signaling may be an example of communications over a secured channel such that the communications are encrypted or otherwise protected from interception or replication by unauthorized devices (e.g., eavesdropper devices such as the attacker wireless device 215-*c*).

Some communications may be susceptible to attacks, interference, or interception from attacking devices. For instance, the wireless device 215-*c* may be an example of an attacker device (e.g., an unauthorized device). The wireless device 215-*c* may transmit a signal 225 to interfere or attack the wireless device 215-*b*. For example, the wireless device 215-*c* may transmit wake up signals (WUSs) (e.g., the wireless device 215-*c* may be a fake network entity 105 and send a Uu WUS, a fake UE 115 and send a sidelink WUS), service requests, or a combination thereof to the target wireless device 215-*b*. The target wireless device 215-*b* may be unable to differentiate a WUS from an authorized device (e.g., the wireless device 215-*a*) and the attacker device 215-*c*, for example, due to the WUSs and service requests not being secured (e.g., a WUS may be a physical layer message such as DCI). Thus, the wireless device 215-*c* may be able to wake up the target wireless device 215-*b* with WUSs, limit the activity of the device 215-*b* with other tasks in response to service requests, and the like, which may result in drained battery life, poor communications efficiency or reliability, or a combination thereof.

The wireless communications system 200 may implement the authentication techniques described herein for communications between the authorized wireless devices 215. For example, the authentication techniques may be used for secure channel communications (e.g., to add additional authenticity), unsecured channel communications (e.g., DCI, UCI, PSFCH, SCI, and the like), or a combination thereof, which may improve security and add authenticity to messages from legitimate or authorized devices in the system. In some examples, the devices may add secure bits (e.g., a signature or other secure bits obtained, for example, from channels and sounding signals between the legitimate nodes such as the wireless devices 215-*a* and 215-*b*) to improve security in the wireless communications system 200. In some examples, improving security in the wireless communications system 200 may be beneficial, for example, in an IoT environment due to many devices being connected to each other, though the techniques herein may beneficially be implemented in any system or environment. In some examples, the level of power of the devices may enable such additional secure bits. Such communication authenticity may enable a receiving device to identify or determine whether a communication is coming from a legitimate wireless device 215 (e.g., a legitimate network entity 105, UE 115, or network node).

Accordingly, the authorized wireless devices 215-*a* and 215-*b* may use one or more signatures in communicated signals. For example, the signal 220 may be encoded with or otherwise include a signature. The signal 220 may be an example of a data message, a control message, a sidelink message, an uplink message, a downlink message, or any combination thereof, among other examples of signals and messages (e.g., the signature may enable authentication of the signal 220, which may be a secured message such as data or RRC L3 secured messages, or an unsecured message such as MAC-CE, DCI, UCI, SCI and the like). In some examples, the signal 220 may include the signal 500 as described with reference to FIG. 5. A signature may be an example of or refer to a set of authentication bits, "S bits," signature bits, and the like.

Such a signature may enable the receiving wireless device 215-*b* to determine an authenticity of the signal 220 (e.g., the receiving wireless device 215-*b* may be able to verify whether the signal 220 was sent from the authorized transmitting wireless device 215-*a* or from the attacker wireless device 215-*c*). For example, the receiving wireless device 215-*b* may receive the signal 220 and generate a set of bits (e.g., signature bits) using the signal 220. The receiving wireless device 215-*b* may compare the generated set of bits to the set of authentication bits included in the signal. In some examples, if the generated set of bits match the set of authentication bits, the receiving wireless device 215-*b* may determine that the signal was transmitted from the authorized transmitting wireless device 215-*a*. In some other examples, if the generated set of bits fail to match the set of authentication bits, or if a received signal does not include the set of authentication bits, the receiving wireless device 215-*b* may determine that the signal was transmitted from an unauthorized device such as the attacking wireless device 215-*c*.

Figure 3:
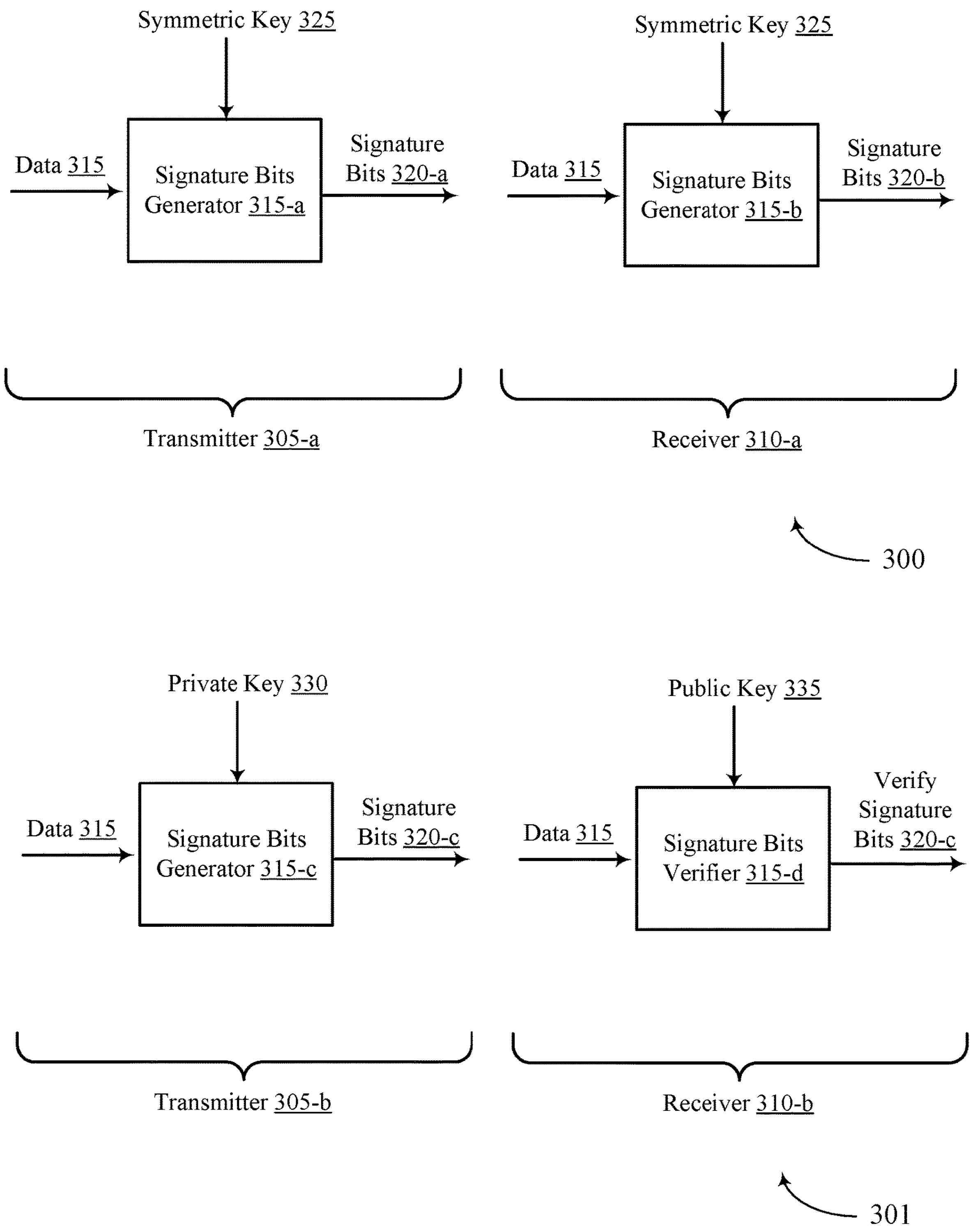
FIGS. 3 and 4 illustrate examples of authentication schemes that support techniques for data authentication in wireless communications systems in accordance with aspects of the present disclosure.
Figure 4:
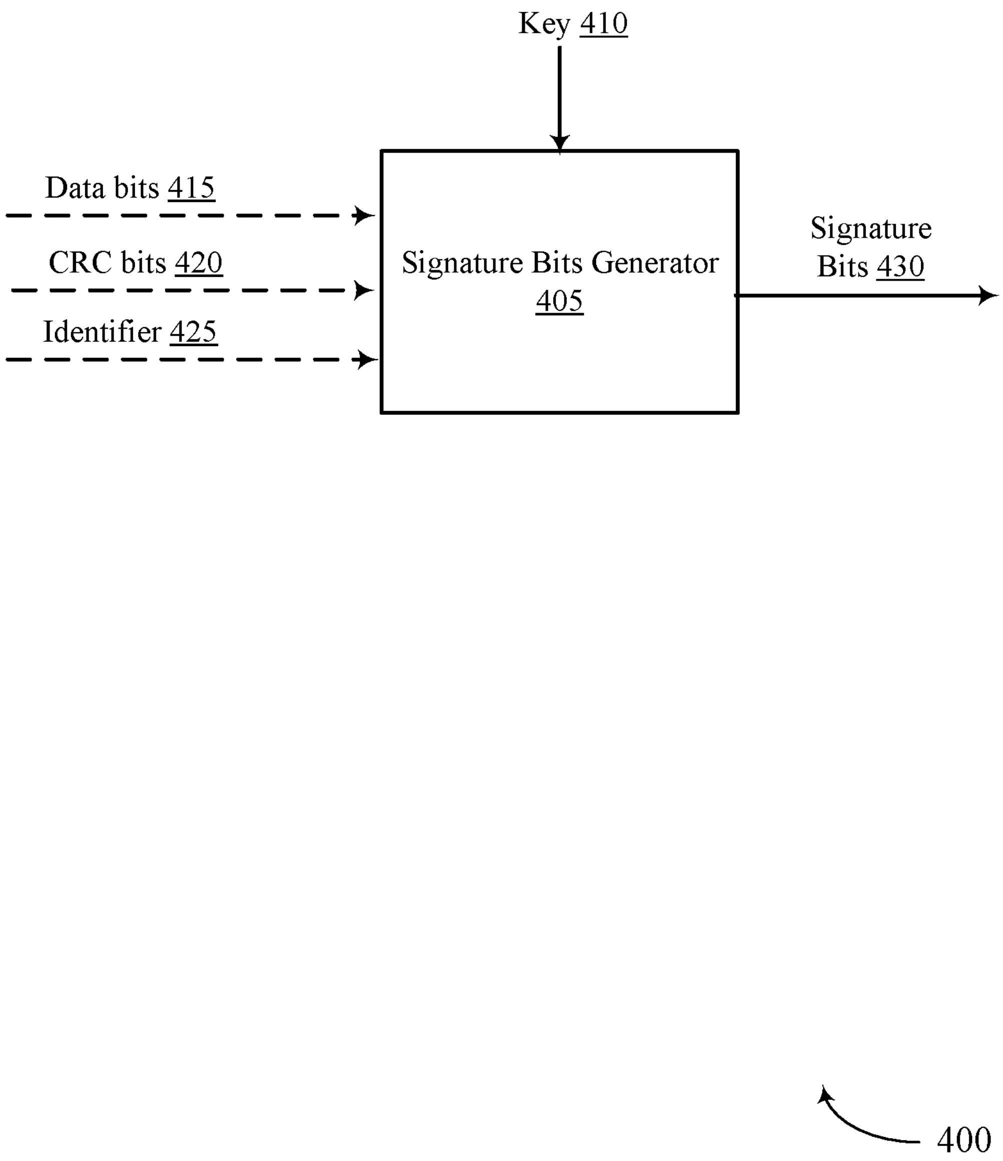

The signature may be generated by the receiving wireless device 215-*b*, the transmitting wireless device 215-*a*, or both, in accordance with one or more authentication schemes as described herein with reference to at least FIGS. 3 and 4. For example, the signature may be generated using one or more keys of a respective authentication scheme. In some examples, the authentication scheme may be an example of a symmetric authentication scheme (e.g., the receiving wireless device 215-*b* and the transmitting wireless device 215-*a* may have a same key used to generate or authenticate the signature bits). Additionally or alternatively, the authentication scheme may be an example of an asymmetric authentication scheme (e.g., the transmitting wireless device 215-*a* may generate the signature bits with a private key and the receiving wireless device 215-*b* may generate or authenticate the signature bits with a public key). In some examples, the authentication scheme may be implemented in conjunction with a commitment scheme as described herein with reference to FIG. 3. In some examples, the signature bits may be based on the one or more keys associated with the authentication scheme, the associated signal (e.g., the bits, code blocks, transport blocks, and the like of a message may be used to generate the signature) one or more error correction bits associated with the signal, one or more identifiers (e.g., an RRC configured security or scrambling identifier (ID)), or any combination thereof, as described with reference to FIG. 4.

In some examples, the wireless devices 215-*a* and 215-*b* may communicate one or more messages 230 associated with the authentication scheme. For example, the devices may communicate capability messages (e.g., the receiver wireless device 215-*b* may indicate a capability to support an asymmetric scheme, a symmetric scheme, or both), the wireless devices 215 may agree on or otherwise indicate an authentication scheme to use from a set of authentication schemes (e.g., a device may be configured to use a symmetric scheme or an asymmetric scheme, for example, based on a capability of one or both of the devices), or a combination thereof. In some examples, the one or more messages 230 may indicate one or more keys. For example, a device may generate or identify a key and indicate the key to other authorized devices (e.g., the transmitting wireless device 215-*a* may generate public and private keys and send the public key in L1, L2, or L3 signaling). In some examples, the wireless devices 215 may be configured to obtain keys for generating or validating the signature from information known to the authorized wireless devices 215 (e.g., the wireless devices 215-*a* and 215-*b* may generate keys from channel estimation metrics or other metrics, and an attacker wireless device 215-*c* may be unable to generate the same key due to differences in the channel between the authorized devices 215 and the channel experienced at the attacker device 215-*c*).

FIG. 3 illustrates examples of authentication schemes 300 and 301 that support techniques for data authentication in wireless communications systems in accordance with aspects of the present disclosure. The authentication schemes 300 and 301 may implement or be implemented by aspects of wireless communications systems 100 and 200. For example, the authentication schemes 300 and 301 may illustrate an authentication process at a transmitter 305 and a receiver 310, which may be examples of the wireless devices 215 as described with reference to FIGS. 1 and 2. Generally, the authentication scheme 300 may illustrate an example of a symmetric authentication scheme and the authentication scheme 301 may illustrate an example of an asymmetric authentication scheme.

In the authentication scheme 300, the transmitter 305-*a* and the receiver 310-*a* may be configured to use a symmetric authentication scheme. In the symmetric scheme, a same symmetric key 325 may be used at both the transmitter 305-*a* and the receiver 310-*a* to generate respective signature bits 320. In other words, symmetric security may be added to a signal (e.g., a signal 220), which may be referred to as a message or a communication. The signature bits 320 may be an example of or referred to as "S bits," signature bits, a set of bits, a set of authentication bits, or a combination thereof.

For example, the transmitter 305-*a* may have data 315 for communication with the receiver 310-*a*. The data 315 may include a set of bits (e.g., code block or transport block bits), error detection or correction bits (e.g., cyclic redundancy check (CRC) bits), or a combination thereof. The transmitter 305-*a* may input the data 315 to the signature bits generator 315-*a* of the transmitter 305-*a*. The signature bits generator 315-*a* may use the symmetric key 325 and the data 315 to generate the signature bits 320-*a*. The signature bits 320-*a* may be added to (e.g., appended or encoded with) a signal to the receiver 310-*a*.

The receiver 310-*a* may have the same symmetric key 325. The receiver 310-*a* may receive and decode the signal to obtain the data 315. The receiver 310-*a* may input the data 315 to the signature bits generator 315-*b* of the receiver 310-*a*. The signature bits generator 315-*b* may use the data 315 and the symmetric key 325 to obtain the signature bits 320-*b*. Thus, the receiver 310-*a* may verify that the signal was sent from an authorized device (e.g., the transmitter 305-*a*). For example, the receiver 310-*a* may compare the signature bits 320-*b* to the signature bits 320-*a* received in the signal. If the signature bits 320-*a* match, align, or otherwise satisfy a threshold with respect to the signature bits 320-*a*, the receiver 310-*a* may determine that the signal is authentic (e.g., the receiver 310-*a* may wake up in response to a WUS, monitor for data in response to a service request, etc., based on the signal being authenticated). Alternatively, if the signature bits 320-*a* fail to satisfy a threshold (e.g., match, align) relative to the signature bits 320-*b*, the receiver 310-*a* may determine that the signal is inauthentic and refrain from responding to the signal (e.g., the receiver 310-*a* may remain idle, refrain from waking up, etc.).

In the authentication scheme 301, the transmitter 305-*a* and the receiver 310-*a* may be configured to use an asymmetric authentication scheme. In the asymmetric scheme, one or more different keys may be used to generate respective signature bits 320. In other words, asymmetric security may be added to a signal (e.g., a signal 220). For example, a private key 330 and/or a public key 335 may be used for generation of the signature bits 320. As an illustrative example, the transmitter 305-*b* may use the private key 330 and the data 315 as inputs to the signature bits generator 315-*c* to output the signature bits 320-*c*. The receiver 310-*b* may receive a signal including the data 315 and/or the signature bits 320-*c*. The receiver 310-*b* may use the signature bits verifier 315-*d* to verify the signature bits 320-*c* using the data 315 and the public key 335 that is different from the private key 330.

For example, the transmitter 305-*b* may generate the public key 335 and the private key 330. The transmitter 305-*b* may indicate the public key 335 to the receiver 215-*b* as described herein. As an example, the public key 335 may be known to various devices in the system (e.g., attacker devices, legitimate receiver devices) and the public key 335 may be used to authenticate messages but may be unable to generate authentic signature bits. That is, the private key 330 may be used to generate the signature bits 320-*c* while the public key 335 may be used to authenticate (e.g., verify, validate) the signature bits 320-*c*. Stated alternatively, devices with a private key 330 (e.g., the transmitter 305-*b* which may not share the private key 330 with other devices) may be able to generate authentic signature bits 320-*c*, while devices with a public key 335 (e.g., any device in the system due to the public key 335 being publicly available) may be able to verify, but not generate or replicate, the signature bits 320-*c*.

In the asymmetric scheme, the public key 335 may be used by the receiver 310-*b* to verify a commitment about the message or message sequence. After decoding the message, the receiver 310-*b* may use the commitment value to check that the message is transmitted from a trusted source (e.g., an authorized transmitter 305-*b*). Attacking devices may be unable to generate commitment keys and override authentic transmissions due to being unaware of the private key, for example, due to the private key 330 which was used at the transmitting side not being known to other devices (e.g., other devices without the private key 330 can determine if the message is authentic or not, but may be unable to regenerate the signature using the public key 335 without the private key 330). In some cases, using such an asymmetric authentication scheme may provide security due to the transmitter 305-*b* having a private key 330 different than a public key 335 used for signature bit generation (e.g., the private key 330 may be unknown to devices other than the transmitter 305-*b*, reducing the risk of an attacker device obtaining a key capable of imitating the signature bits 320 in a way that would be successfully checked by the receiver 310-*b*, while the public key 335 may be indicated via signaling or other mechanisms).

In some examples, a transmitter 305 and a receiver 310 may agree whether to use a symmetric or asymmetric authentication scheme. For example, the devices may communicate one or more messages indicating a capability of the devices to use one or both schemes, a message configuring, requesting, or configuring one or both schemes, or a combination thereof, among other examples of messaging related to the authentication scheme. In some examples, the various keys may additionally or alternatively be referred to as secret keys (e.g., the private key 330 and/or the symmetric key 325).

In some examples of the symmetric authentication scheme, the devices may obtain the symmetric key 325 via signaling. For example, one device may generate the symmetric key 325 and indicate the symmetric key 325 via a message of the one or more messages (e.g., upper layer signaling such as L3 or other secured signaling, or unsecured signaling). In some examples, the symmetric key 325 may be shared using an asymmetric key method (e.g., the receiver 310 may generate the key and send the key in a message). In some examples, a key may be obtained via a key extraction method (e.g., without explicitly signaling the key), for example, using a channel associated with the communications (e.g., a physical channel for physical layer communications).

As an illustrative example of a secret key extraction method, a secret key may be extracted (e.g., derived, generated) from channel randomness associated with a channel between two authentic nodes. For example, two devices, such as a UE 115 and a network entity 105, may send reference signals to each other. Each node (e.g., device) may estimate its channel between the two nodes using the reference signals. For example, a node may obtain a metric based on the channel (e.g., a channel power, reference signal received power (RSRP), signal to noise ratio (SNR), signal to noise and interference ratio (SINR), phase metrics, or any combination thereof, among other examples of metrics). The node may quantize the mapped value or use it as an input to a key derivation function. That is, the node may use a table mapping the metric to a key or the node may input the metric to a function (e.g., an equation) such as Equation 1A and/or 1B below:

derivedKey=HMAC-SHA-256(Metric,[other parameters]) (1A)

derivedKey=HMAC-SHA-256(K,[other parameters]) (1B)

In Equation 1A, the derivedKey may represent the key derived based on the channel metric, and the HMAC-SHA-256 may represent a function (e.g., a hashing function) with an input of the channel metric. Further, Equation 1A may additionally or alternatively have other parameters as inputs to generate the key. In Equation 1B, the derivedKey may represent the key derived based on the channel metric, and the HMAC-SHA-256 may represent a function (e.g., a hashing function) with an input of the key. It is to be understood that while Equations 1A and 1B are shown for exemplary purposes, any function or key extraction method may be used.

In some examples of the key extraction, the secret key may thus be obtained at both nodes. In some examples, the extraction method may be secured (e.g., in high SNR cases, the channel quality metric is likely to be the same or similar at both nodes resulting in a same key). In some examples, repetition of pilot signals or a key refinement procedure may be used (e.g., in low SNR cases, such techniques may increase the likelihood that the same key is obtained at each node). The secret key may be used to secure transmissions, secure fields within a channel (e.g., information in a physical channel such as PDCCH, PUCCH, PDSCH, PUSCH, or a combination thereof), add authentication bits as described herein, or any combination thereof.

In some examples of the asymmetric method, the transmitter 305 may generate the private key 330 and the public key 335. The transmitter 305 may indicate the public key in one or more channels. The one or more channels may include L1 channels (e.g., control channels such as PDCCH, PUCCH, or PSCCH, downlink or sidelink data channels such as PDSCH, PUSCH, or PSSCH), L2 channels (e.g., Uu or PC5 MAC-CE), L3 channels (e.g., Uu or PC5-RRC), or any combination thereof. In some examples, signaling of keys may be done via secured channels (e.g., L3 secured channels such as PDSCH, PUSCH, PSSCH, or RRC), which may provide extra security compared to signaling on unsecured channels.

In some examples, the asymmetric authentication scheme 301 may be used in addition or alternative to a commitment scheme (e.g., in physical layer messages of DCI, UCI, PDSCH, PUSCH, PSCCH, PSSCH, or any combination thereof, among other examples of signaling and messages). For example, as described above, commitment values may be obtained for the asymmetric authentication scheme 301 using a private key 330. Such commitment values may be generated or derived from a respective commitment scheme, which may be configured at the devices (e.g., signaled in one or more messages and/or pre-configured at the devices).

As illustrative examples of commitment schemes, the commitment scheme may include a cryptographic commitment or a TESLA commitment scheme. For example, the cryptographic commitment may leverage Pederson commitment (e.g., the scheme may be based on the difficulty of discrete log problems and/or may be unconditionally hiding and computationally binding). Such a commitment scheme may have an algorithm with some public parameters, which may be parameters shared with UEs via L1, L2, or L3 signaling. The algorithm may generate the S bits based on inputting at least the secret key and data (e.g., code block bits and/or CRC bits of, for example, PDSCH, PSSCH, PDCCH, SCI, or DCI messages) into a hash function based on a set of parameters (e.g., public parameters, randomly selected parameters). By inputting parameters and/or the secret key into the hash, the signature bits may be generated and transmitted as described herein, and a receiver device may verify the committed value after receiving the channel (in addition to one or more parameters used for checking the commitment value). Such a scheme may be provably secure and/or may be extended to prove many things without opening, such as zero-knowledge proof (ZKP). The ZKP may be leveraged in a Pederson commitment with Fiat-Shamir scheme, and may add that a secret is not shared with the UEs.

In some examples, the hash function (e.g., a cryptographic hash function) may have one or more IDs (e.g., PDSCH, PSSCH, DCI, or SCI scrambling ID or a combination of such IDs with a timestamp, or code block/code block and CRC bits, or a combination thereof) as inputs, which may enable the authentication techniques described herein.

As an example of the TESLA commitment scheme, the devices may use a broadcast authentication mechanism. This mechanism may be similar to a hash commitment scheme, and may use a reverse hash chain (e.g., the network discloses hash values, or keys, in the reverse order of a calculation, and the key is disclosed later and verified using the previously disclosed key). In some such examples, if two keys are used (e.g., one for PDCCH, and one for PDSCH), then the keys can be assigned in the reverse order such that PDCCH key is transmitted later than the PDSCH key. In other words, a control key (e.g., for PDSCH or PSCCH) may be later compared to a data channel key (e.g., PDSCH or PSSCH), and the actual channel transmissions may be transmitted in the opposite order.

FIG. 4 illustrates an example of an authentication scheme 400 that supports techniques for data authentication in wireless communications systems in accordance with aspects of the present disclosure. The authentication scheme 400 may implement or be implemented by aspects of wireless communications systems 100 and 200. For example, the authentication scheme 400 may illustrate an authentication process at a wireless device, which may be an example of the wireless devices 215 as described with reference to FIGS. 1 and 2.

The authentication scheme 400 may show one or more options for generating a set of signature bits 430. Thus, a set of authentication bits 430 may be added to a message or signal (e.g., messages or signals of DCI, UCI, PDSCH, PSSCH, and the like) based on a secret key that is protected (e.g., unknown to an attacker device). For example, a DCI signal may include a WUS or a service request signal.

The device may input the key 410 to the signature bits generator 405, which may be examples of keys and generators as described with reference to FIG. 3. Additionally or alternatively, the device may input the data bits 415, the CRC bits 420, the identifier 425, or any combination thereof to the signature bits generator 405. Stated alternatively, the signature bits 430, may be based on (e.g., generated using)

the data bits 415, the CRC bits 420, the identifier 425, or a combination thereof. The data bits 415 may be an example of data included in a signal or message (e.g., a signal 220), such as the code block or transport block bits as described with reference to FIG. 5. The CRC bits 420 may be an example of error correction or detection bits (e.g., bits of CRC, although other error correction or detection types may be used). The identifier 425 may be an example of an ID an RRC configured security ID or scrambling ID, although other parameters or IDs may be used.

In some examples, the signature bits 430 (i.e., "S") may be based on one or more modes of operations. For example, S may be generated in accordance with the one or more modes of operation, and each S associated with a respective mode may or may not have a different size. In some examples, the mode of operation may be configured (e.g., indicated in one or more messages or preconfigured at the device). For example, in a first mode, the signature bits 430 may be based on the CRC bits 420 per code block of the signal, in a second mode the signature bits 430 may be based on the data bits 415 (e.g., bits or data in a code block), in a third mode the signature bits 430 may be based on both the data bits 415 and the CRC bits 420, in a fourth mode the signature bits 430 may be based on the identifier 425, and in a fifth mode the signature bits 430 may be based on some combination of the CRC bits 420, the data bits 415, and the identifier 425.

In some examples, the size of the signature bits 430 (e.g., the quantity of bits) may be fixed or variable. For example, the size may be variable and adjusted according to an authentication level (e.g., a priority of transmission or a security level). In some such examples, one or more security levels may be available for configuration. For example, a device may configure and/or select a security level based on priority or a desired security (e.g., a first security level may be associated with generating signature bits 430 having a smaller size, a second security level may be associated with generating signature bits 430 having a larger size, a third security level may be associated with generating signature bits 430 having a fixed size and then puncturing or selecting bits from S to be sent, or other security levels).

Figure 5:
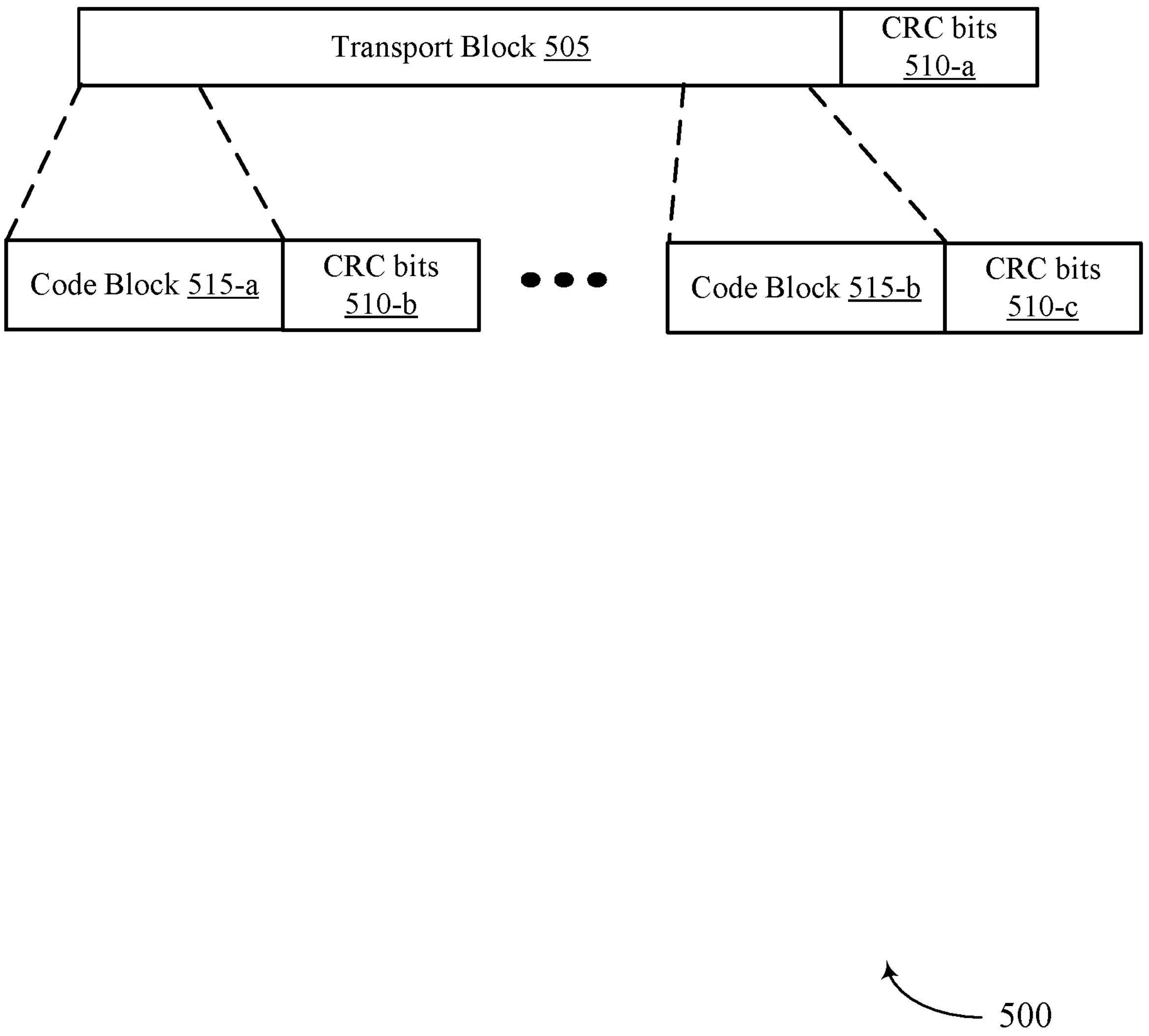
FIG. 5 illustrates an example of a signal that supports techniques for data authentication in wireless communications systems in accordance with aspects of the present disclosure.

FIG. 5 illustrates an example of a signal 500 that supports techniques for data authentication in wireless communications systems in accordance with aspects of the present disclosure. The signal 500 may implement or be implemented by aspects of wireless communications systems 100 and 200. For example, the signal 500 may illustrate an example of a signal or message prior to the addition of signature bits as described herein.

The signal 500 may include a transport block 505. The transport block 505 may include one or more code blocks 515 (e.g., the code blocks 515-*a* and 515-*b*). In some examples, the transport block may have error correction bits associated with the entire transport block. For example, the transport block may be associated with the CRC bits 510-*a*. Additionally or alternatively, one or more code blocks 515 may be associated with a respective set of error correction bits. For example, the code block 515-*a* may be associated with the CRC bits 510-*b*, the code block 515-*b* may be associated with the CRC bits 510-*c*, and so on.

In some examples, the signal 500 may be an example of one or more aspects of the schemes and systems described herein. For example, the transport block 505, the code block 515-*a*, the code block 515-*b*, or any combination thereof may be an example of data bits 415 as described with reference to FIG. 4. Additionally or alternatively, a some or all of the CRC bits 510 may be examples of the CRC bits 420 as described with reference to FIG. 4.

In accordance with the techniques described herein, signature bits may be generated based on the signal 500, for example, as described with reference to FIGS. 1-4. Such signature bits (i.e., signature, S, S bits, set of authentication bits) may be added or encoded to the signal 500 before transmission as described with reference to FIG. 6.

In some examples, the S bits may be associated with one or more groups of code blocks 515. For example, a group of code blocks 515 (e.g., with or without respective CRC bits 510) may be used to generate a single set of S bits that refers to the group of code blocks (e.g., a respective S corresponds to each group of code blocks). The size of the group may be selected, for instance, to increase or reduce the overall size of S. For example, a large quantity of code blocks 515 in a group may result in a reduced amount of bits to send one or more signatures.

Additionally or alternatively, S may be generated based on the transport block 505. That is, the S may be applied on the transport block level where S may be generated based on the transport block 505 (e.g., with or without the CRC bits 510-*a*). In some examples, S may be used as a signature in addition or alternative to additional CRC bits for checking the data was successfully received or encoded. In some examples, the generation of S may be based on the actual data or payload before the addition of security (e.g., the raw data before generating code blocks 515 and transport blocks 505 using, for example, L3 security scrambling and encoding). In some examples, such generation may provide additional security (e.g., since the S is linked to the L3 secured original sequence of bits and thus more difficult for an unauthorized device to replicate or determine).

In some examples, the method of generating S and the size of S may be indicated by a device (e.g., a network entity 105 or a primary UE or controlling UE in sidelink may indicate the scheme and/or size of S through L1, L2, or L3 signaling), agreed on by devices (e.g., UEs in sidelink may indicate or configure the scheme and/or size of S through L1, L2, or L3 signaling). In some examples, the configuration of the scheme and/or size of S (e.g., asymmetric or symmetric, the encoding scheme, the quantity of S bits, the method for puncturing or selecting S bits, and the like) may be configured per resource pool. For example, a network entity may indicate a configuration per resource pool, and indications from a transmitting device to a receiving device may be done using L1, L2, or L3 signaling (e.g., SCI-2). Additionally or alternatively, UEs 115 in sidelink may be configured by a primary or controlling UE 115 through L1, L2, or L3 signaling.

In some examples, the S bits may be generated based on previous signals 500. That is, the S bits may be based on previous messages (e.g., code blocks 515 or transport blocks 505 or both) that were successfully decoded by the authorized devices. As an example, such messages may include uplink and downlink data or control channel messages. The set of messages (e.g., the set of code blocks 515 or transport blocks 505) used for a current transmission authenticity (e.g., the S bits of the present signal 500) may be configured via signaling (e.g., one or more messages associated with an authentication scheme, such as messages via L3 signaling) or on a PDSCH or PSSCH transmission. In some other examples, the selected set of messages may be determined randomly (or random-like) using a secret key. Stated alternatively, the secret key may indicate which code blocks 515 and/or transport blocks 505 that were successfully decoded (e.g., associated with acknowledgement feedback messages)

are to be used for generating the S bits (e.g., the key may indicate a value N, such that the selected message is the Nth transmission before the current transmission).

Figure 6:
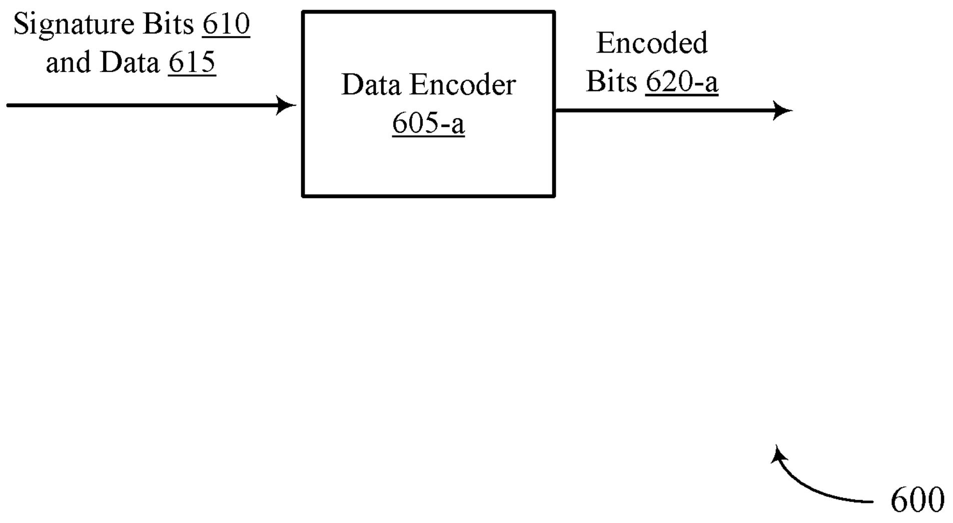
FIG. 6 illustrates examples of encoding schemes that support techniques for data authentication in wireless communications systems in accordance with aspects of the present disclosure.
Figure 6:
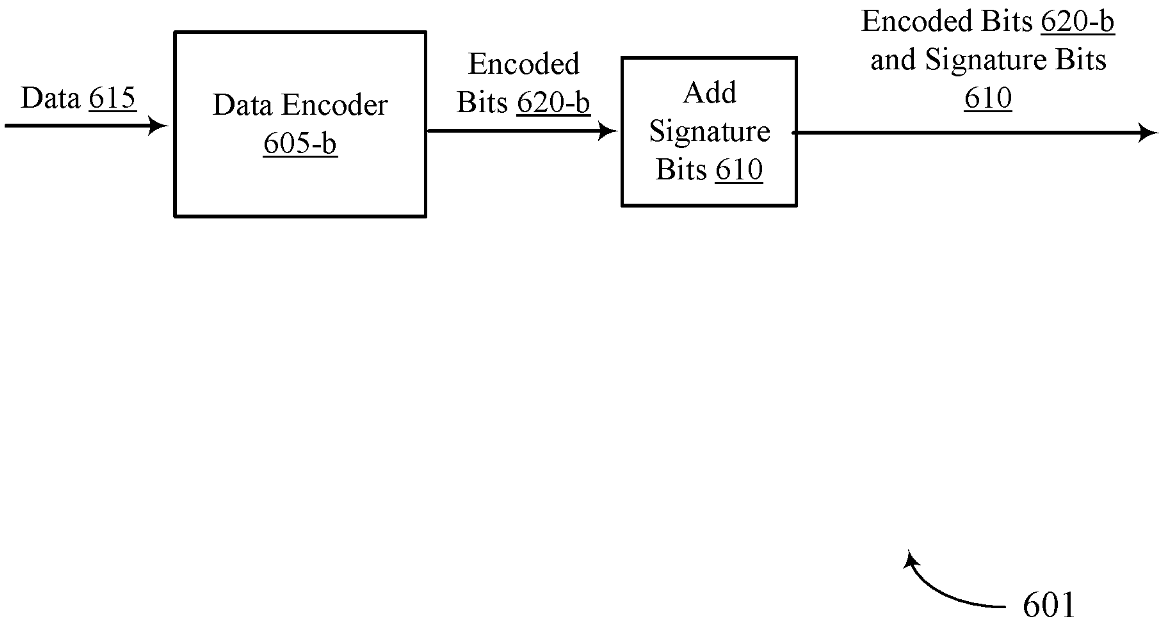

FIG. 6 illustrates examples of encoding schemes 600 and 601 that support techniques for data authentication in wireless communications systems in accordance with aspects of the present disclosure. The encoding schemes 600 and 601 may implement or be implemented by aspects of wireless communications systems 100 and 200. For example, the encoding schemes 600 and 601 may illustrate an encoding process at a transmitter, which may be an example of the wireless devices 215 as described with reference to FIGS. 1 and 2. The encoding schemes 600 and 601 may include signature bits 610 and data 615, which may be an example of signature bits and data, respectively, as described herein with reference to FIGS. 1-5.

In the encoding scheme 600, the data encoder 605-*a* may be configured to encode both the signature bits 610 and the data 615. That is, the device may jointly encode the signature bits 610 and the data 615 to obtain encoded bits 620-*a* for transmission to another device (e.g., the signature bits 610 are added prior to channel encoding).

In the encoding scheme 601, the data encoder 605-*b* may be configured to encode the data 615 to obtain the encoded bits 620-*b*, then add (e.g., append) the signature bits 610 to the encoded bits 620-*b* for transmission to another device. In some examples, S may be used as added parity or CRC bits for a reliability check at the receiving device. In some examples, the data 615 may include bits from a signal (e.g., code block or transport block bits such as from signal 500, CRC bits such as from the signal 500, or a combination thereof as described herein).

Figure 7:
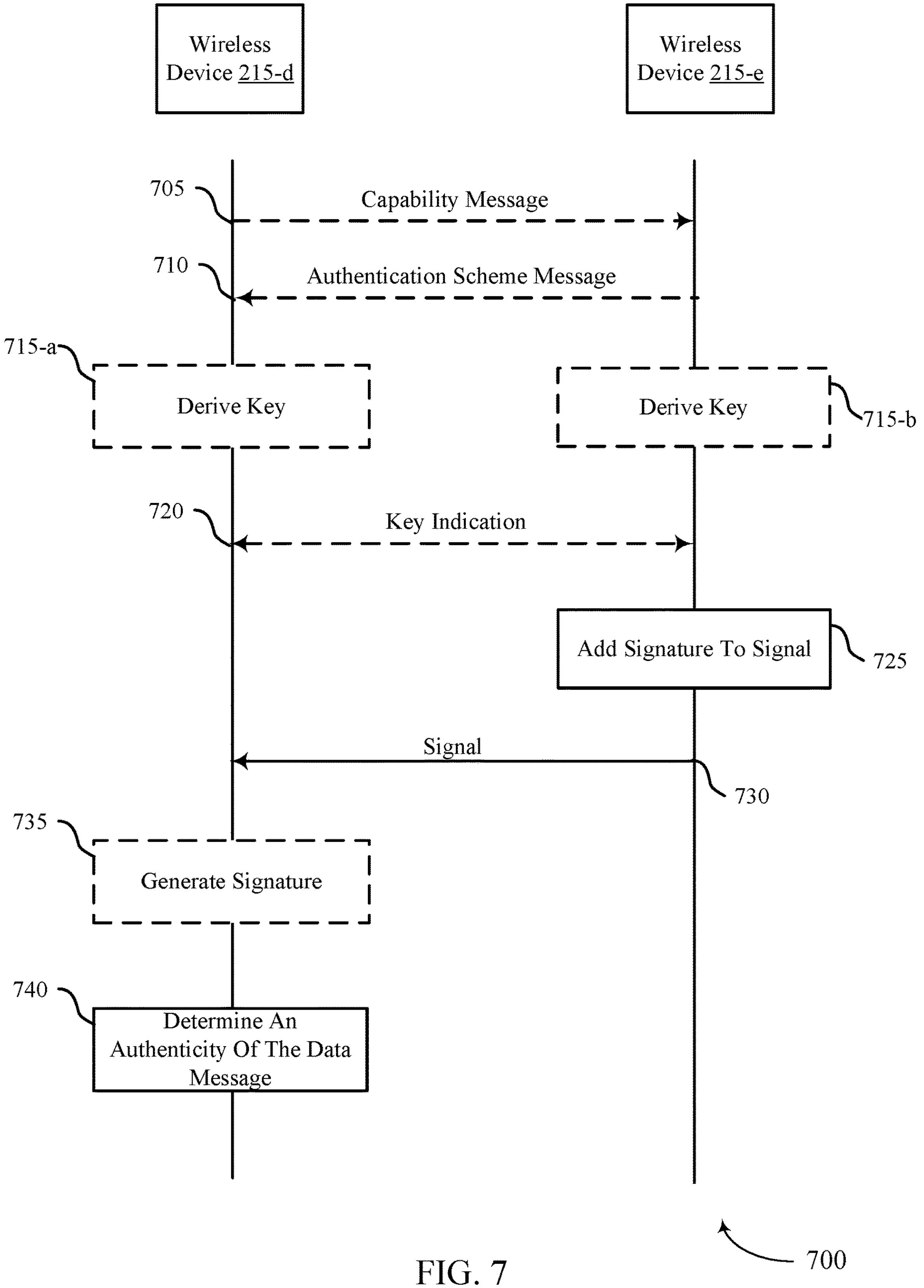
FIG. 7 illustrates an example of a process flow that supports techniques for data authentication in wireless communications systems in accordance with aspects of the present disclosure.

FIG. 7 illustrates an example of a process flow 700 that supports techniques for data authentication in wireless communications systems in accordance with aspects of the present disclosure. The process flow 700 may implement or be implemented by aspects of wireless communications systems 100 and 200. For example, the process flow 700 may include a wireless device 215-*d* and a wireless device 215-*e*, which may be examples of the wireless devices as described herein with reference to FIG. 2 (e.g., UEs 115 and/or network entities 105). In the following description of the process flow 700, the operations between the wireless devices 215 may be transmitted in a different order than the example order shown, or the operations performed by the wireless devices 215 may be performed in different orders or at different times. Some operations may also be omitted from the process flow 700, and other operations may be added to the process flow 700. In some examples, operations described as being performed by the wireless device 215-*d* may additionally or alternatively be performed by the wireless device 215-*e*, and vice versa.

In some examples, at 705 the wireless device 215-*d* may transmit a capability message to the wireless device 215-*e*. For example, the wireless devices 215 may communicate one or more messages associated with an authentication scheme, and the one or more messages may include one or more capability messages as described herein (e.g., the capability message may indicate a capability of the wireless device 215-*d* to support one or more authentication schemes).

In some examples, at 710 the wireless device 215-*e* may send an authentication scheme message to the wireless device 215-*d*. For example, the wireless device 215-*e* may indicate, via the one or more messages including the authentication scheme message, the authentication scheme is an asymmetric or symmetric scheme, a bit selection pattern for a set of signature bits, and the like, as described herein with reference to FIGS. 1-6.

In some examples, at 715-*a* and 715-*b*, the wireless device 215-*d*, the wireless device 215-*e*, or both may derive a key in accordance with the authentication scheme. For example, the wireless devices 215-*d* and 215-*e* may generate one or more keys in accordance with an asymmetric scheme or a symmetric scheme, each device may derive a key using a key extraction method, and the like, as described herein with reference to FIGS. 1-6.

In some examples, at 720 the wireless devices 215 may indicate one or more keys. For example, in an asymmetric scheme, the wireless device 215-*e* may indicate a public key (e.g., the wireless device 215-*e* may generate a public key and a private key for authentication of messages and indicate the public key to one or more devices including the wireless device 215-*d*). Additionally or alternatively, in a symmetric scheme, the wireless device 215-*e* may indicate a secret key (e.g., symmetric key) as described herein with reference to FIGS. 1-6. In some examples, the messaging of 705, 710, 720, or a combination thereof may be referred to as one or more messages associated with an authentication scheme.

At 725, the wireless device 215-*e* may add one or more signatures to a signal as described herein with reference to FIGS. 1-6. At 730, the wireless device 215-*e* may send the signal to the wireless device 215-*d*. In some examples, the signal may be transmitted via a set of resources associated with the authentication scheme (e.g., a resource pool configured with the authentication scheme).

In some examples, at 735, the wireless device 215-*d* may generate a signature. At 740, the wireless device 215-*d* may determine an authenticity of the signal (e.g., a data message) as described herein with reference to FIGS. 1-6. For example, the wireless device 215-*d* may use a public key associated with an asymmetric authentication scheme to verify that a set of signature bits associated with the signal are authentic (e.g., the public key may be used to determine that the transmitter of the signal has a private key used to generate the bits).

Figure 8:
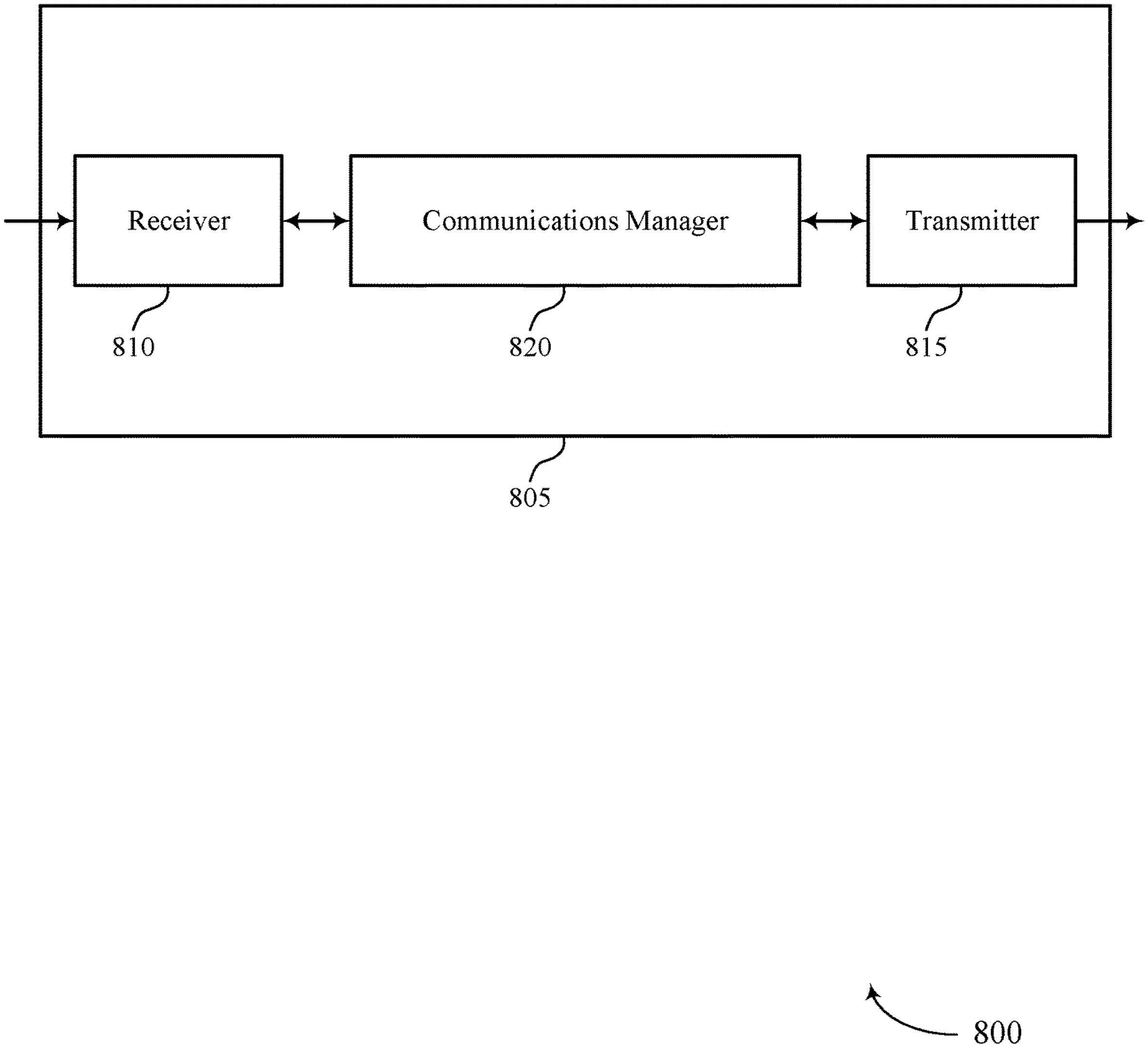
FIGS. 8 and 9 show block diagrams of devices that support techniques for data authentication in wireless communications systems in accordance with aspects of the present disclosure.

FIG. 8 shows a block diagram 800 of a device 805 that supports techniques for data authentication in wireless communications systems in accordance with aspects of the present disclosure. The device 805 may be an example of aspects of a wireless device (e.g., a UE 115, a network entity 105) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for data authentication in wireless communications systems). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for data authentication in wireless communications systems). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for data authentication in wireless communications systems as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first wireless device in accordance with examples as disclosed herein. For example, the communications manager 820 may be configured as or otherwise support a means for communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both. The communications manager 820 may be configured as or otherwise support a means for receiving a signal via a set of resources associated with the authentication scheme. The communications manager 820 may be configured as or otherwise support a means for performing an authentication procedure on the signal to determine an authenticity of the signal based on at least one key associated with the authentication scheme and a set of bits generated based on the authentication scheme, where the authenticity indicates whether the signal is from the second wireless device or another wireless device.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for authentication of communications. Such techniques may enable the devices to determine an authenticity of communications, which may result in reduced processing, reduced power consumption, more efficient, secure, or reliable communications, or any combination thereof at least at a modem or processor of the device 805.

Figure 9:
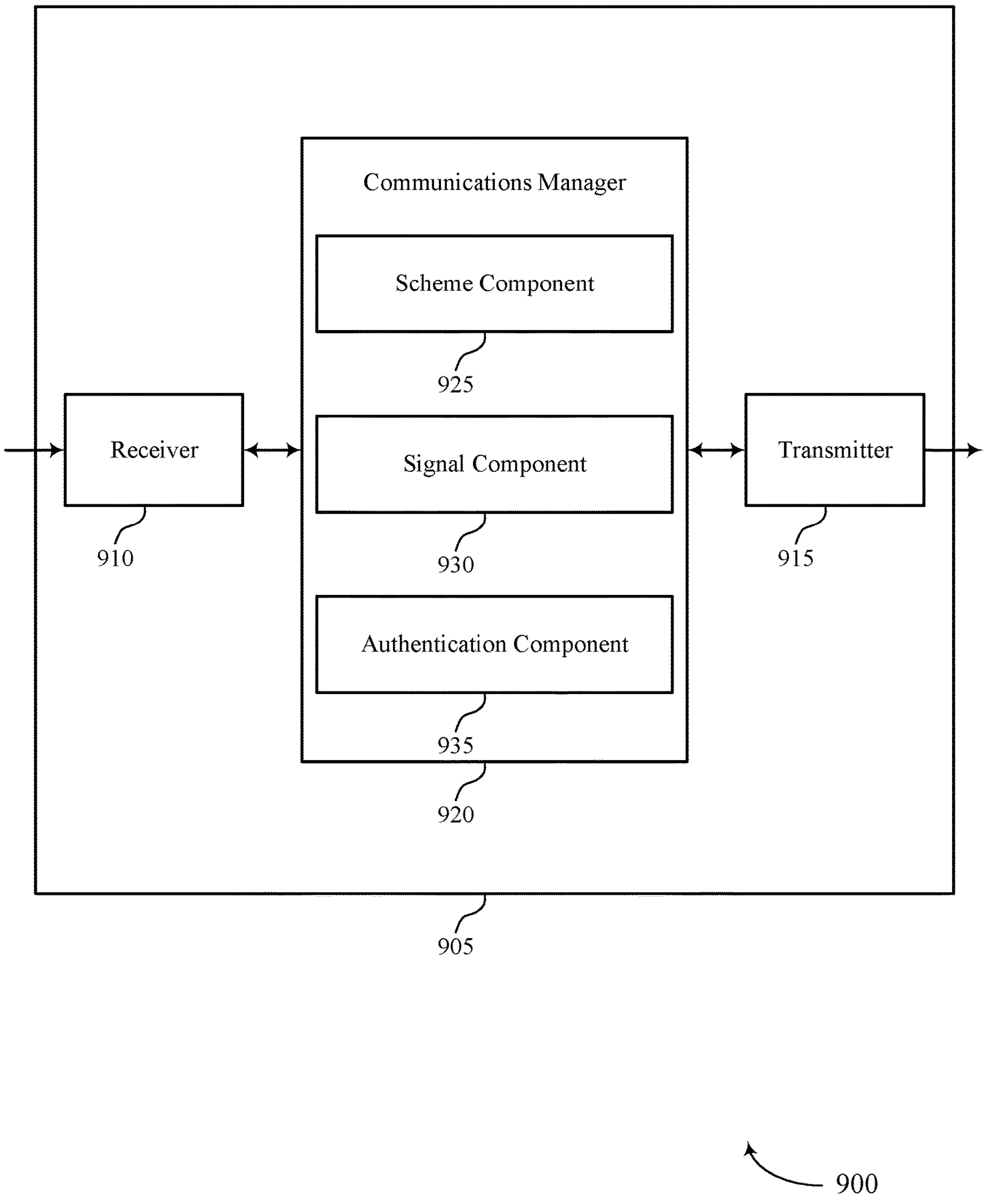

FIG. 9 shows a block diagram 900 of a device 905 that supports techniques for data authentication in wireless communications systems in accordance with aspects of the present disclosure. The device 905 may be an example of aspects of a device 805 or a wireless device (e.g., a UE 115, a network entity 105) as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for data authentication in wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for data authentication in wireless communications systems). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for data authentication in wireless communications systems as described herein. For example, the communications manager 920 may include a scheme component 925, a signal component 930, an authentication component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first wireless device in accordance with examples as disclosed herein. The scheme component 925 may be configured as or otherwise support a means for communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both. The signal component 930 may be configured as or otherwise support a means for receiving a signal via a set of resources associated with the authentication scheme. The authentication component 935 may be configured as or otherwise support a means for performing an authentication procedure on the signal to determine an authenticity of the signal based on at least one key associated with the authentication scheme and a set of bits generated based on the authentication scheme, where the authenticity indicates whether the signal is from the second wireless device or another wireless device.

Figure 10:
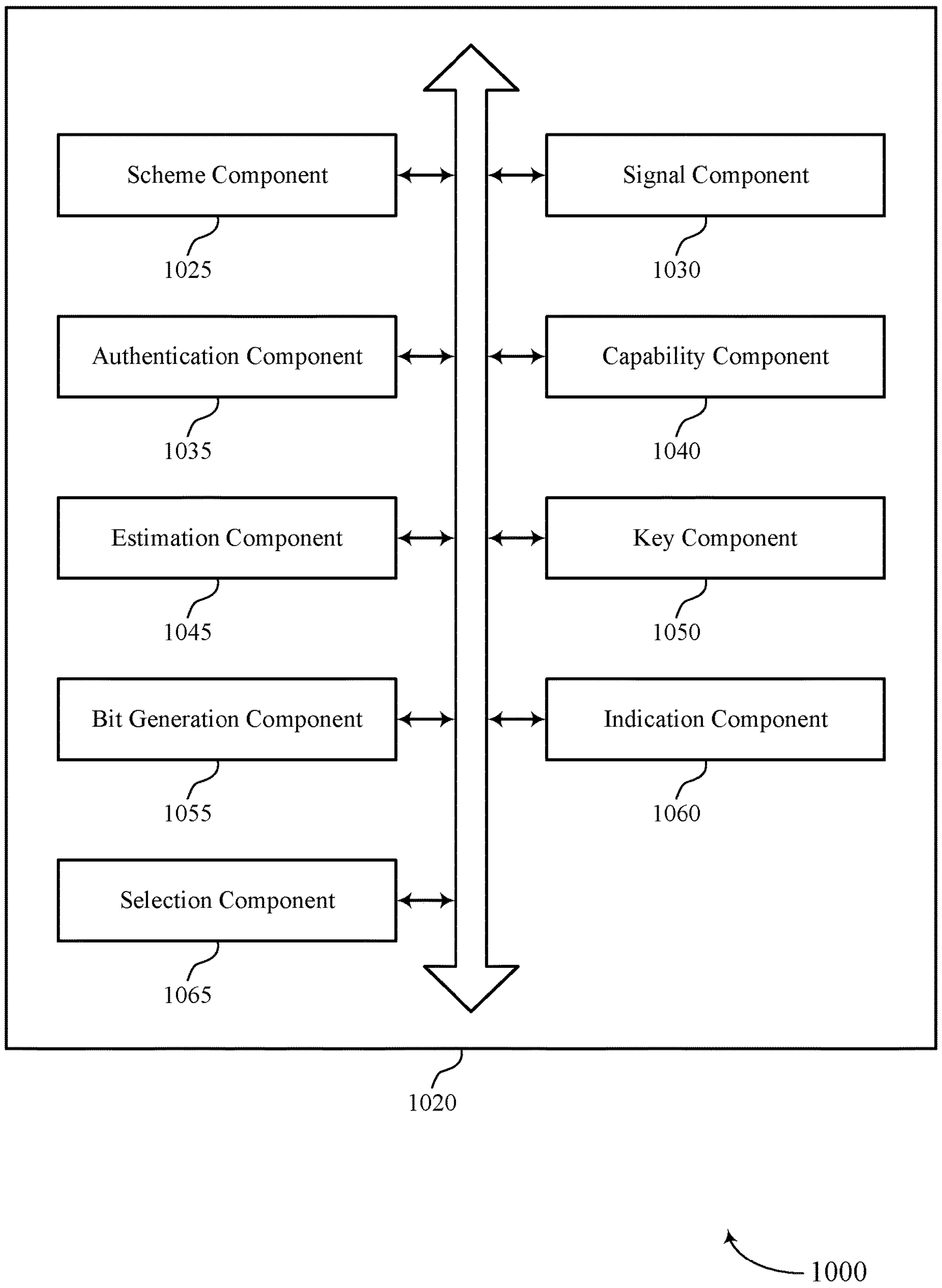
FIG. 10 shows a block diagram of a communications manager that supports techniques for data authentication in wireless communications systems in accordance with aspects of the present disclosure.

FIG. 10 shows a block diagram 1000 of a communications manager 1020 that supports techniques for data authentication in wireless communications systems in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for data authentication in wireless communications systems as described herein. For example, the communications manager 1020 may include a scheme component 1025, a signal component 1030, an authentication component 1035, a capability component 1040, an estimation component 1045, a key component 1050, a bit generation component 1055, an indication component 1060, a selection component 1065, or any combination thereof. Each of these components may communicate, directly or indirectly, with one another (e.g., via one or more buses).

The communications manager 1020 may support wireless communications at a first wireless device in accordance with examples as disclosed herein. The scheme component 1025 may be configured as or otherwise support a means for communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both. The signal component 1030 may be configured as or otherwise support a means for receiving a signal via a set of resources associated with the authentication scheme. The authentication component 1035 may be configured as or otherwise support a means for performing an authentication procedure on the signal to determine an authenticity of the signal based on at least one key associated with the authentication scheme and a set of bits generated based on the authentication scheme, where the authenticity indicates whether the signal is from the second wireless device or another wireless device.

In some examples, to support communicating the one or more messages, the capability component 1040 may be configured as or otherwise support a means for transmitting a capability message indicating the capability of the first wireless device. In some examples, to support communicating the one or more messages, the scheme component 1025 may be configured as or otherwise support a means for receiving, from the second wireless device, a message indicating that the authentication scheme includes one of the symmetric authentication scheme or the asymmetric authentication scheme based on the capability of the first wireless device, the capability of the second wireless device, or both.

In some examples, the estimation component 1045 may be configured as or otherwise support a means for estimating a channel associated with the set of resources to obtain a channel metric. In some examples, the key component 1050 may be configured as or otherwise support a means for deriving the at least one key associated with the authentication scheme based on the channel metric.

In some examples, the key component 1050 may be configured as or otherwise support a means for generating the at least one key based on the authentication scheme, where the at least one key includes a public key and a private key based on the authentication scheme being the asymmetric authentication scheme. In some examples, the key component 1050 may be configured as or otherwise support a means for communicating a message indicating the at least one key with the second wireless device.

In some examples, the authentication scheme may include the asymmetric authentication scheme. In some examples, the key component 1050 may be configured as or otherwise support a means for receiving, from the second wireless device, an indication of a public key of the at least one key. In some examples, the authentication component 1035 may be configured as or otherwise support a means for determining the authenticity of the signal using the public key, the set of bits generated using a private key of the at least one key, the signal, or any combination thereof.

In some examples, to support communicating the one or more messages, the scheme component 1025 may be configured as or otherwise support a means for receiving a message from the second wireless device configuring the authentication scheme for one or more resource pools, where the set of resources includes a subset of the one or more resource pools.

In some examples, to support performing the authentication procedure, the bit generation component 1055 may be configured as or otherwise support a means for generating the set of bits using the at least one key associated with the authentication scheme and using the signal. In some examples, to support performing the authentication procedure, the authentication component 1035 may be configured as or otherwise support a means for comparing the generated set of bits to a set of authentication bits included in the signal. In some examples, to support performing the authentication procedure, the authentication component 1035 may be configured as or otherwise support a means for determining the authenticity of the signal based on the comparison.

In some examples, the set of authentication bits are based on a mode of operation. In some examples, a size of the set of authentication bits corresponds to the mode of operation, a security level indicated by the one or more messages, or any combination thereof.

In some examples, the set of authentication bits, the generated set of bits, or both are based on one or more code blocks of the signal, one or more error detection bits of the signal, one or more identifiers, or any combination thereof.

In some examples, the key component 1050 may be configured as or otherwise support a means for communicating a message indicating the at least one key associated with the authentication scheme.

In some examples, to support communicating the message, the key component 1050 may be configured as or otherwise support a means for communicating the message indicating the at least one key via layer 1 signaling, layer 2 signaling, layer 3 signaling, or any combination thereof.

In some examples, to support communicating the message, the key component 1050 may be configured as or otherwise support a means for communicating the message via a secure channel.

In some examples, a set of authentication bits included in the signal are jointly encoded with one or more code blocks and error detection bits of the signal. In some examples, the set of authentication bits included in the signal are appended to encoded bits of the signal, the encoded bits indicating the one or more code blocks, the error detection bits, or a combination thereof.

In some examples, a set of authentication bits included in the signal corresponds to a group of code blocks of the signal.

In some examples, the signal component 1030 may be configured as or otherwise support a means for communicating a set of signals prior to receiving the signal, where the set of bits are generated based on successful decoding of the set of signals.

In some examples, the indication component 1060 may be configured as or otherwise support a means for receiving an indication of a set of code blocks or a set of transport blocks of the set of signals, where the set of bits are generated based on the indication. In some examples, the selection component 1065 may be configured as or otherwise support a means for selecting the set of code blocks or the set of transport blocks of the set of signals based on the at least one key, where the set of bits are generated based on the selecting.

Figure 11:
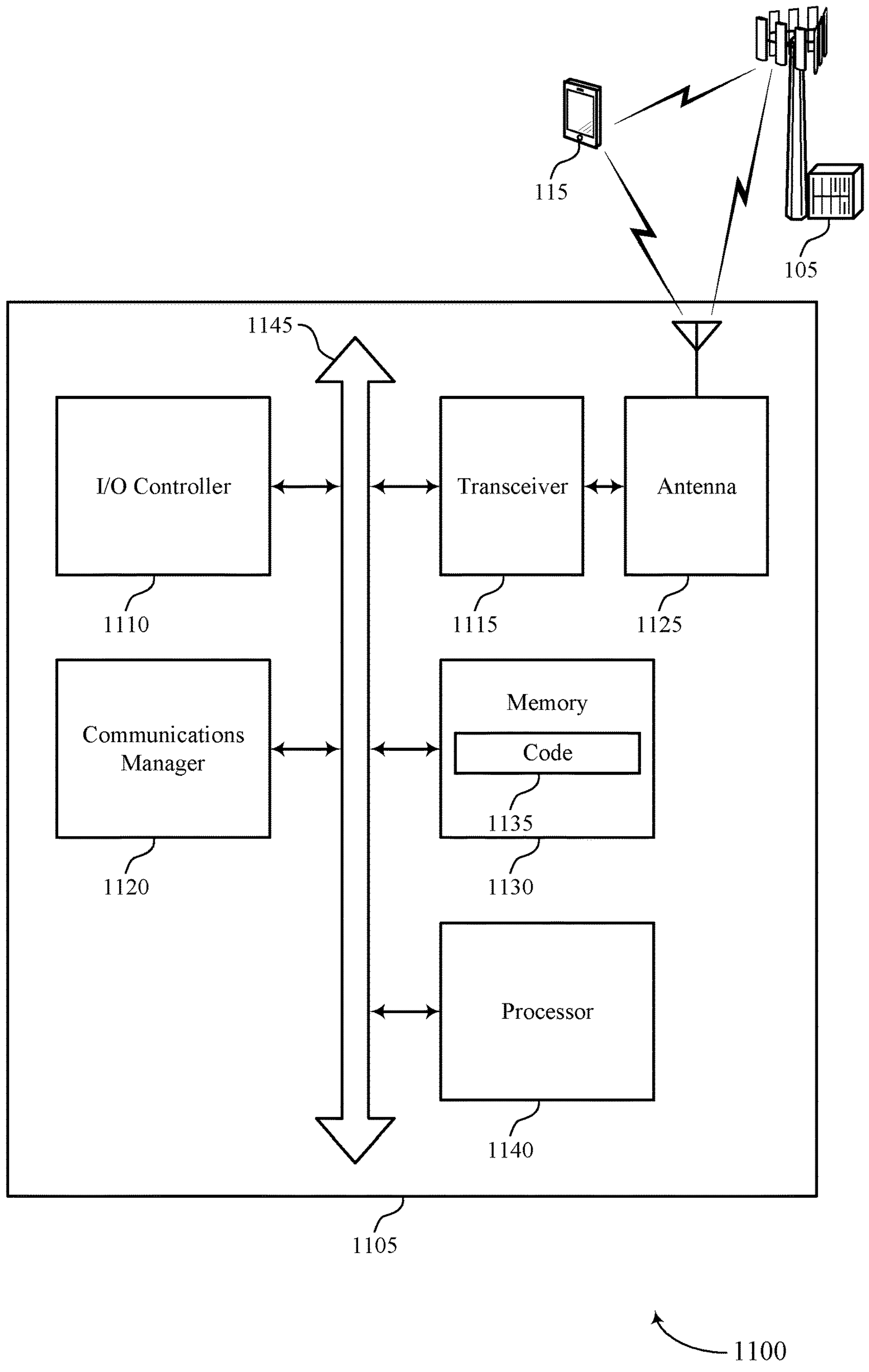
FIG. 11 shows a diagram of a system including a device that supports techniques for data authentication in wireless communications systems in accordance with aspects of the present disclosure.

FIG. 11 shows a diagram of a system 1100 including a device 1105 that supports techniques for data authentication in wireless communications systems in accordance with aspects of the present disclosure. The device 1105 may be an example of or include the components of a device 805, a device 905, or a wireless device (e.g., a UE 115, a network entity 105) as described herein. The device 1105 may communicate wirelessly with one or more network entities 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for data authentication in wireless communications systems). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a first wireless device in accordance with examples as disclosed herein. For example, the communications manager 1120 may be configured as or otherwise support a means for communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both. The communications manager 1120 may be configured as or otherwise support a means for receiving a signal via a set of resources associated with the authentication scheme. The communications manager 1120 may be configured as or otherwise support a means for performing an authentication procedure on the signal to determine an authenticity of the signal based on at least one key associated with the authentication scheme and a set of bits generated based on the authentication scheme, where the authenticity indicates whether the signal is from the second wireless device or another wireless device.

By including or configuring the communications manager 1120 in accordance with examples as described herein, the device 1105 may support techniques for authentication of communications. Such techniques may enable the devices to determine an authenticity of communications, which may result in reduced processing and improved user experience, improved power consumption (e.g., longer battery life), more efficient, secure, or reliable communications, or any combination thereof at the device 1105.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for data authentication in wireless communications systems as described herein, or the processor 1140 and the memory 1130 may be otherwise configured to perform or support such operations.

Figure 12:
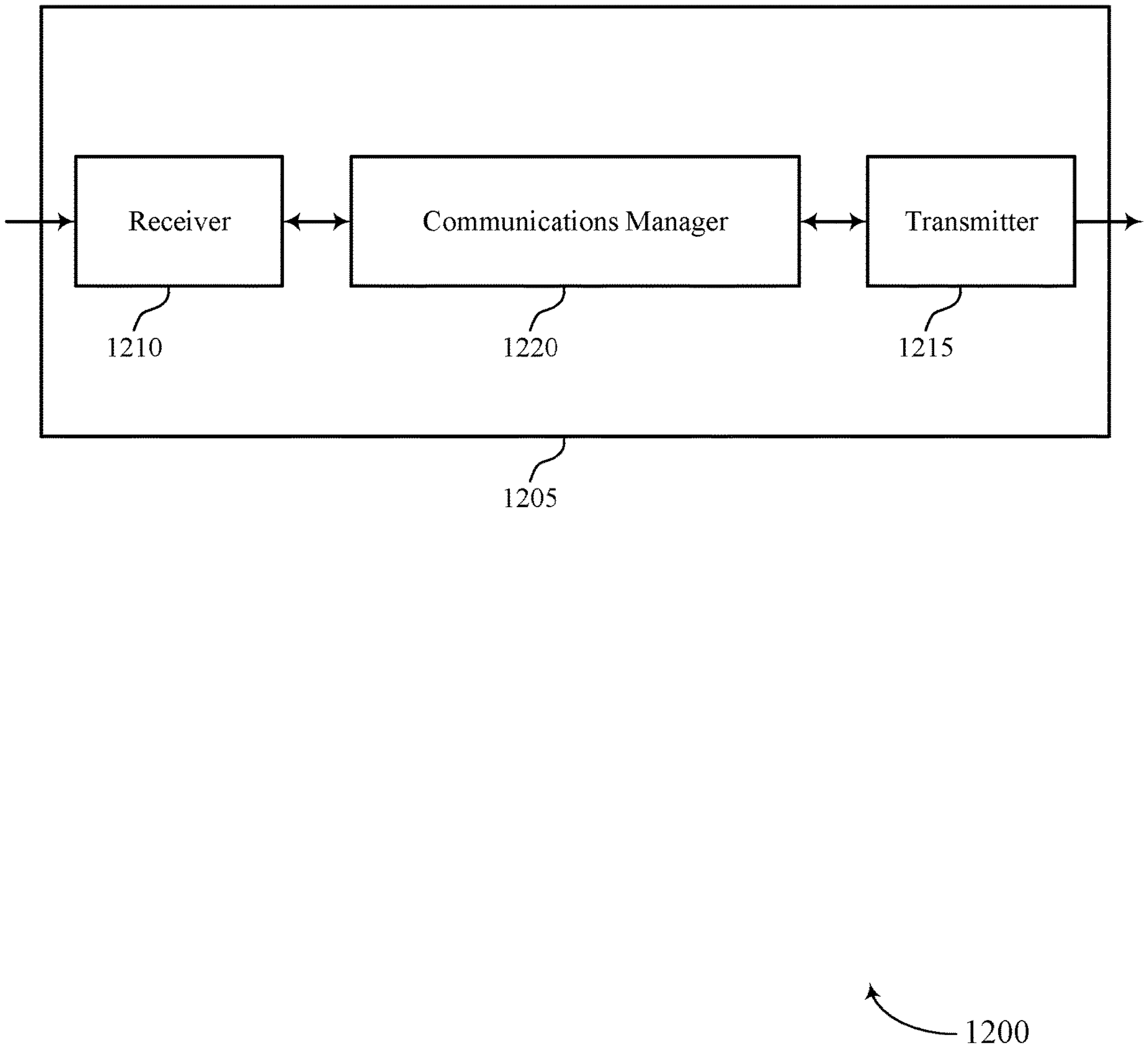
FIGS. 12 and 13 show block diagrams of devices that support techniques for data authentication in wireless communications systems in accordance with aspects of the present disclosure.

FIG. 12 shows a block diagram 1200 of a device 1205 that supports techniques for data authentication in wireless communications systems in accordance with aspects of the present disclosure. The device 1205 may be an example of aspects of a wireless device (e.g., a UE 115, a network entity 105) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for data authentication in wireless communications systems). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for data authentication in wireless communications systems). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of techniques for data authentication in wireless communications systems as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a second wireless device in accordance with examples as disclosed herein. For example, the communications manager 1220 may be configured as or otherwise support a means for communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both. The communications manager 1220 may be configured as or otherwise support a means for transmitting a signal via a set of resources associated with the authentication scheme, the signal including a set of authentication bits generated based on the authentication scheme and at least one key associated with the authentication scheme.

By including or configuring the communications manager 1220 in accordance with examples as described herein, the device 1205 (e.g., a processor controlling or otherwise coupled to the receiver 1210, the transmitter 1215, the communications manager 1220, or a combination thereof)

may support techniques for authentication of communications. Such techniques may enable the devices to determine an authenticity of communications, which may result in reduced processing, reduced power consumption, more efficient, secure, or reliable communications, or any combination thereof at least at a modem or processor of the device 1205.

Figure 13:
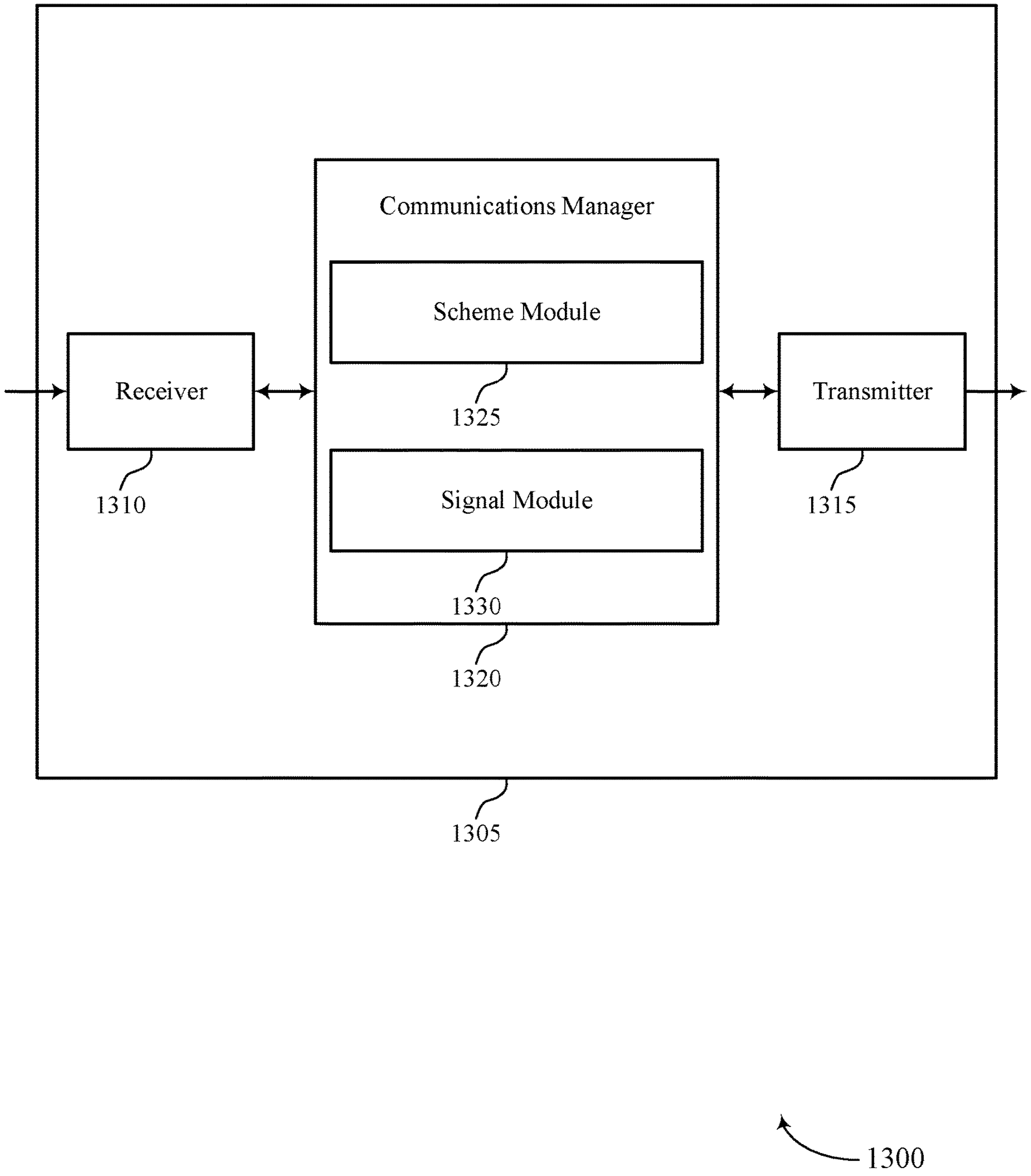

FIG. 13 shows a block diagram 1300 of a device 1305 that supports techniques for data authentication in wireless communications systems in accordance with aspects of the present disclosure. The device 1305 may be an example of aspects of a device 1205 or a wireless device (e.g., a UE 115, a network entity 105) as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for data authentication in wireless communications systems). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for data authentication in wireless communications systems). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of techniques for data authentication in wireless communications systems as described herein. For example, the communications manager 1320 may include a scheme module 1325 a signal module 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a second wireless device in accordance with examples as disclosed herein. The scheme module 1325 may be configured as or otherwise support a means for communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both. The signal module 1330 may be configured as or otherwise support a means for transmitting a signal via a set of resources associated with the authentication scheme, the signal including a set of authentication bits generated based on the authentication scheme and at least one key associated with the authentication scheme.

Figure 14:
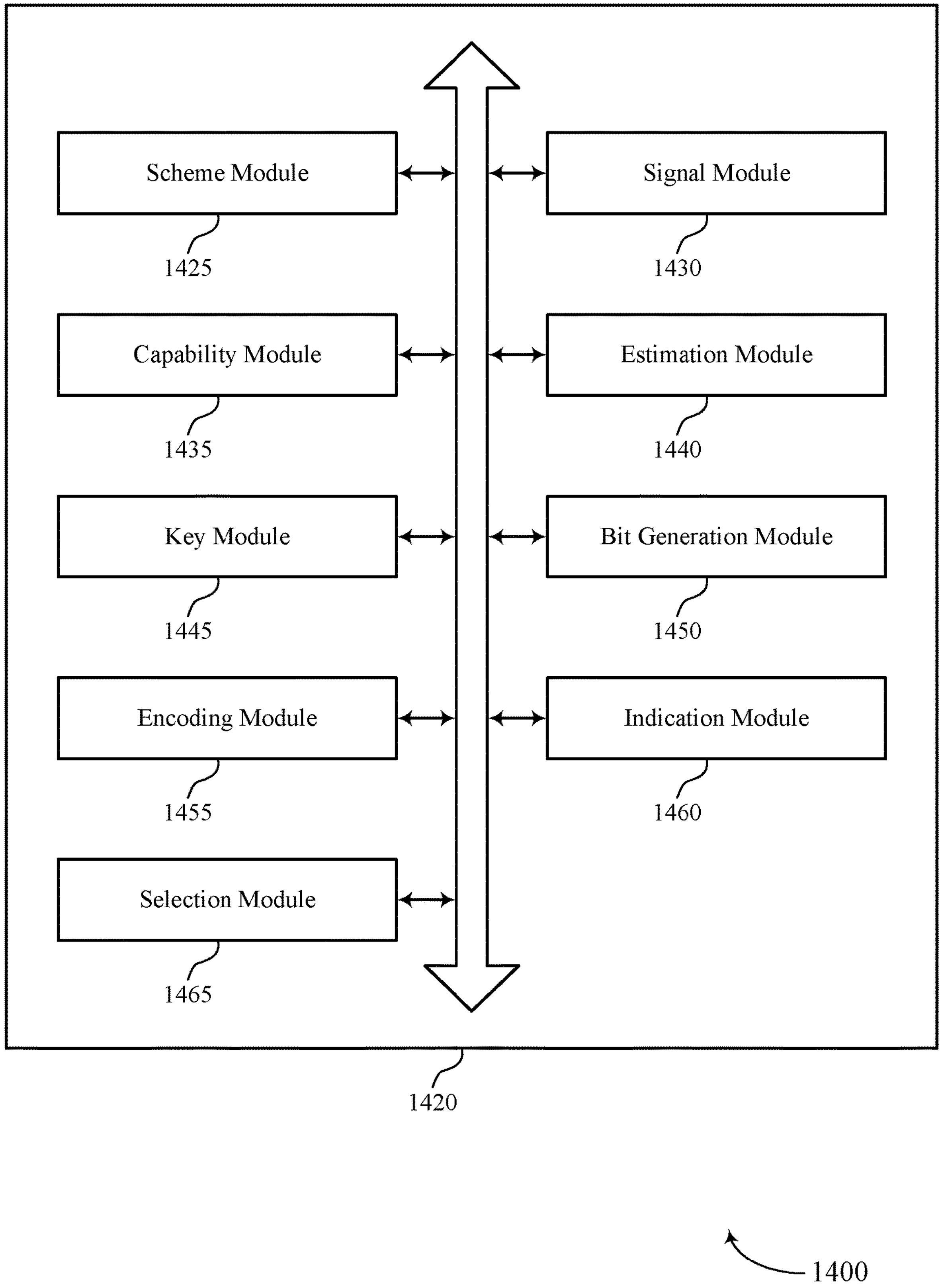
FIG. 14 shows a block diagram of a communications manager that supports techniques for data authentication in wireless communications systems in accordance with aspects of the present disclosure.

FIG. 14 shows a block diagram 1400 of a communications manager 1420 that supports techniques for data authentication in wireless communications systems in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of techniques for data authentication in wireless communications systems as described herein. For example, the communications manager 1420 may include a scheme module 1425, a signal module 1430, a capability module 1435, an estimation module 1440, a key module 1445, a bit generation module 1450, an encoding module 1455, an indication module 1460, a selection module 1465, or any combination thereof. Each of these components may communicate, directly or indirectly, with one another (e.g., via one or more buses).

The communications manager 1420 may support wireless communications at a second wireless device in accordance with examples as disclosed herein. The scheme module 1425 may be configured as or otherwise support a means for communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both. The signal module 1430 may be configured as or otherwise support a means for transmitting a signal via a set of resources associated with the authentication scheme, the signal including a set of authentication bits generated based on the authentication scheme and at least one key associated with the authentication scheme.

In some examples, to support communicating the one or more messages, the capability module 1435 may be configured as or otherwise support a means for receiving a capability message indicating the capability of the first wireless device. In some examples, to support communicating the one or more messages, the scheme module 1425 may be configured as or otherwise support a means for transmitting, to the second wireless device, a message indicating that the authentication scheme includes one of the symmetric authentication scheme or the asymmetric authentication scheme based on the capability of the first wireless device, the capability of the second wireless device, or both.

In some examples, the estimation module 1440 may be configured as or otherwise support a means for estimating a channel associated with the set of resources to obtain a channel metric. In some examples, the key module 1445 may be configured as or otherwise support a means for deriving the at least one key associated with the authentication scheme based on the channel metric.

In some examples, the key module 1445 may be configured as or otherwise support a means for communicating a message indicating the at least one key with the first wireless device, where the at least one key includes a public key and a private key based on the authentication scheme being the asymmetric authentication scheme.

In some examples, the authentication scheme may include the asymmetric authentication scheme. In some examples, the key module 1445 may be configured as or otherwise support a means for generating a public key and a private key of the at least one key associated with the authentication scheme. In some examples, the key module 1445 may be configured as or otherwise support a means for transmitting, to the first wireless device, an indication of the public key. In some examples, the bit generation module 1450 may be configured as or otherwise support a means for generating the set of authentication bits using the private key, where the set of authentication bits are verifiable using the public key.

In some examples, to support communicating the one or more messages, the scheme module 1425 may be configured as or otherwise support a means for transmitting a message to the first wireless device configuring the authentication scheme for one or more resource pools, where the set of resources include a subset of the one or more resource pools.

In some examples, the bit generation module 1450 may be configured as or otherwise support a means for generating the set of authentication bits using the at least one key associated with the authentication scheme and using the signal, where the set of authentication bits are based on a mode of operation, a security level indicated by the one or more messages, one or more code blocks of the signal, one or more error detection bits of the signal, one or more identifiers, or any combination thereof.

In some examples, the encoding module 1455 may be configured as or otherwise support a means for jointly encoding the set of authentication bits with one or more code blocks and error detection bits of the signal. In some examples, the encoding module 1455 may be configured as or otherwise support a means for appending the set of authentication bits to encoded bits of the signal, the encoded bits indicating the one or more code blocks and the error detection bits.

In some examples, the signal module 1430 may be configured as or otherwise support a means for communicating a set of signals prior to receiving the signal, where the set of authentication bits are generated based on successful decoding of the set of signals.

In some examples, the indication module 1460 may be configured as or otherwise support a means for receiving an indication of a set of code blocks or a set of transport blocks of the set of signals, where the set of authentication bits are generated based on the indication. In some examples, the selection module 1465 may be configured as or otherwise support a means for selecting the set of code blocks or the set of transport blocks of the set of signals based on the at least one key, where the set of authentication bits are generated based on the selecting.

In some examples, the key module 1445 may be configured as or otherwise support a means for communicating a message indicating the at least one key associated with the authentication scheme.

In some examples, to support communicating the message, the key module 1445 may be configured as or otherwise support a means for communicating the message indicating the at least one key via layer 1 signaling, layer 2 signaling, layer 3 signaling, or any combination thereof.

In some examples, to support communicating the message, the key module 1445 may be configured as or otherwise support a means for communicating the message via a secure channel.

Figure 15:
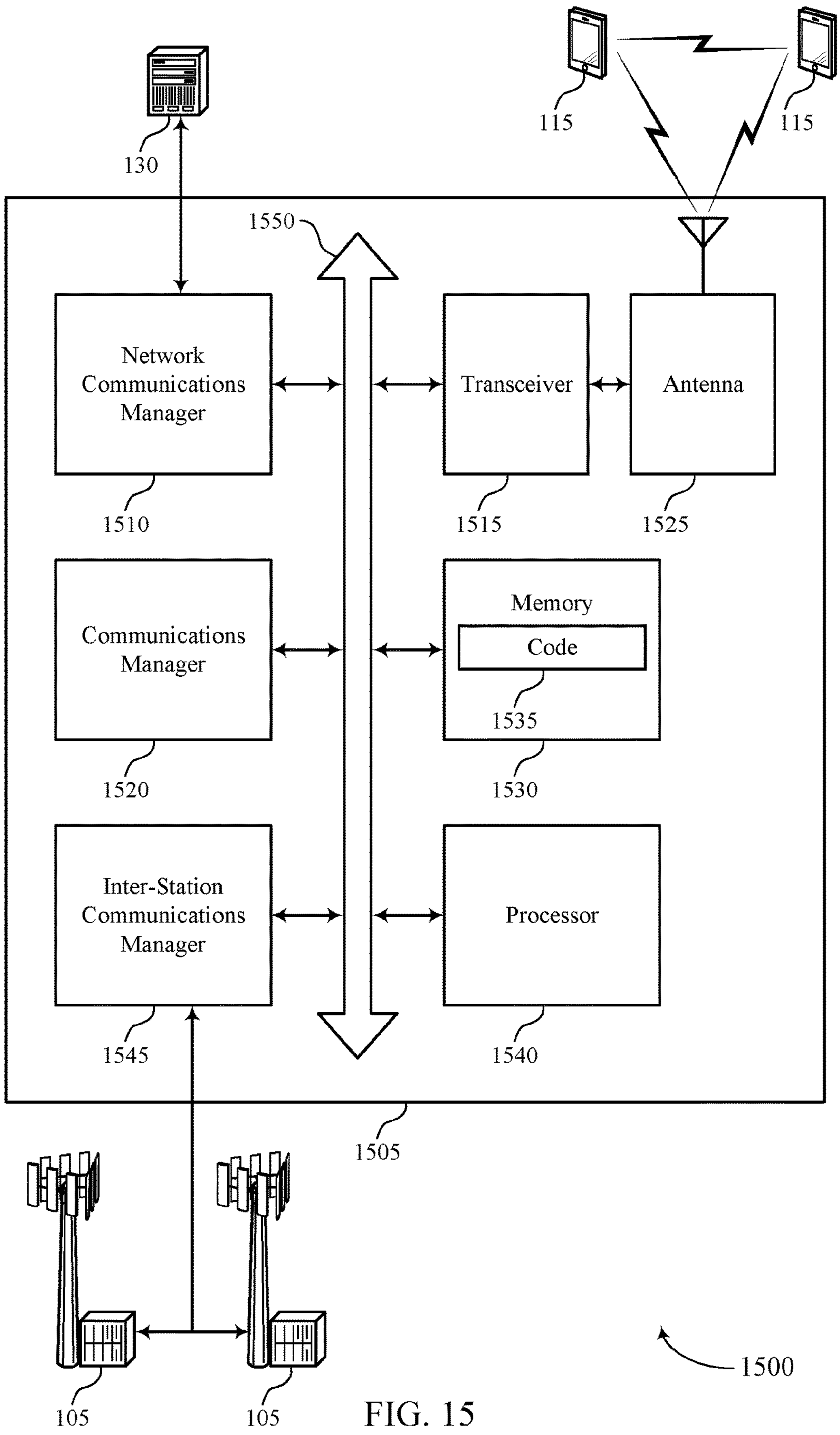
FIG. 15 shows a diagram of a system including a device that supports techniques for data authentication in wireless communications systems in accordance with aspects of the present disclosure.

FIG. 15 shows a diagram of a system 1500 including a device 1505 that supports techniques for data authentication in wireless communications systems in accordance with aspects of the present disclosure. The device 1505 may be an example of or include the components of a device 1205, a device 1305, or a wireless device (e.g., a UE 115, a network entity 105) as described herein. The device 1505 may communicate wirelessly with one or more network entities 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for data authentication in wireless communications systems). For example, the device 1505 or a component of the device 1505 may include a processor 1540 and memory 1530 coupled with or to the processor 1540, the processor 1540 and memory 1530 configured to perform various functions described herein.

The inter-station communications manager 1545 may manage communications with other network entities 105, and may include a controller or scheduler for controlling communications with UEs 115 in cooperation with other network entities 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between network entities 105.

The communications manager 1520 may support wireless communications at a second wireless device in accordance with examples as disclosed herein. For example, the communications manager 1520 may be configured as or otherwise support a means for communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both. The communications manager 1520 may be configured as or otherwise support a means for transmitting a signal via a set of resources associated with the authentication scheme, the signal including a set of authentication bits generated based on the authentication scheme and at least one key associated with the authentication scheme.

By including or configuring the communications manager 1520 in accordance with examples as described herein, the device 1505 may support techniques for authentication of communications. Such techniques may enable the devices to determine an authenticity of communications, which may result in reduced processing, reduced power consumption, more efficient, secure, or reliable communications, or any combination thereof at least at a modem or processor of the device 1505.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of techniques for data authentication in wireless communications systems as described herein, or the processor 1540 and the memory 1530 may be otherwise configured to perform or support such operations.

Figure 16:
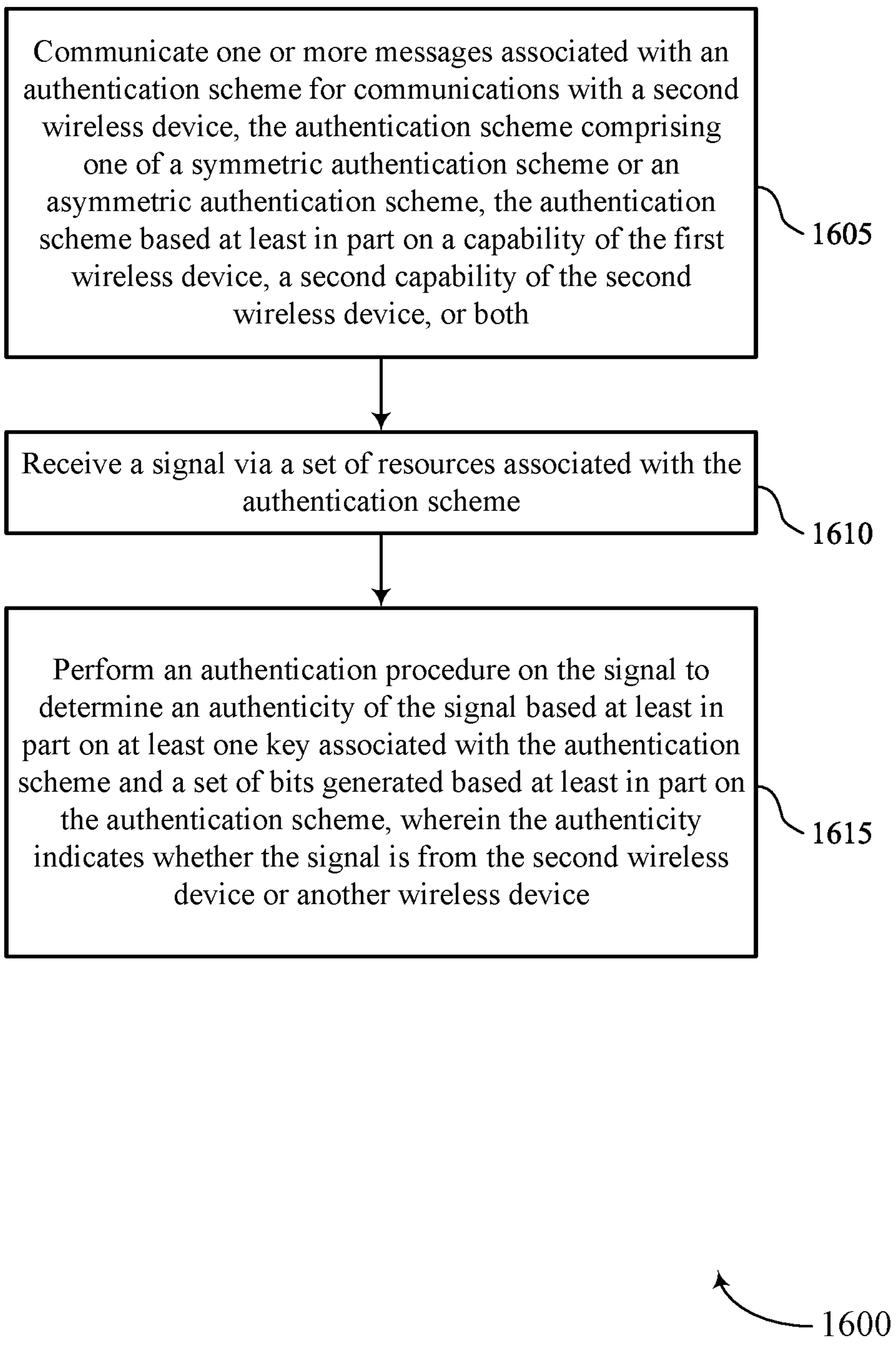
FIGS. 16 through 21 show flowcharts illustrating methods that support techniques for data authentication in wireless communications systems in accordance with aspects of the present disclosure.

FIG. 16 shows a flowchart illustrating a method 1600 that supports techniques for data authentication in wireless communications systems in accordance with aspects of the present disclosure. The operations of the method 1600 may be implemented by a receiving wireless device (e.g., a UE 115, a network entity 105) or its components as described herein. For example, the operations of the method 1600 may be performed by a wireless device as described with reference to FIGS. 1 through 11. In some examples, a wireless device may execute a set of instructions to control the functional elements of the wireless device to perform the described functions. Additionally or alternatively, the wireless device may perform aspects of the described functions using special-purpose hardware.

At 1605, the method may include communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both. The operations of 1605 may be performed in accordance with examples as disclosed herein. In some examples, aspects of the operations of 1605 may be performed by a scheme component 1025 as described with reference to FIG. 10.

At 1610, the method may include receiving a signal via a set of resources associated with the authentication scheme. The operations of 1610 may be performed in accordance with examples as disclosed herein. In some examples, aspects of the operations of 1610 may be performed by a signal component 1030 as described with reference to FIG. 10.

At 1615, the method may include performing an authentication procedure on the signal to determine an authenticity of the signal based on at least one key associated with the authentication scheme and a set of bits generated based on the authentication scheme, where the authenticity indicates whether the signal is from the second wireless device or another wireless device. The operations of 1615 may be performed in accordance with examples as disclosed herein. In some examples, aspects of the operations of 1615 may be performed by an authentication component 1035 as described with reference to FIG. 10.

Figure 17:
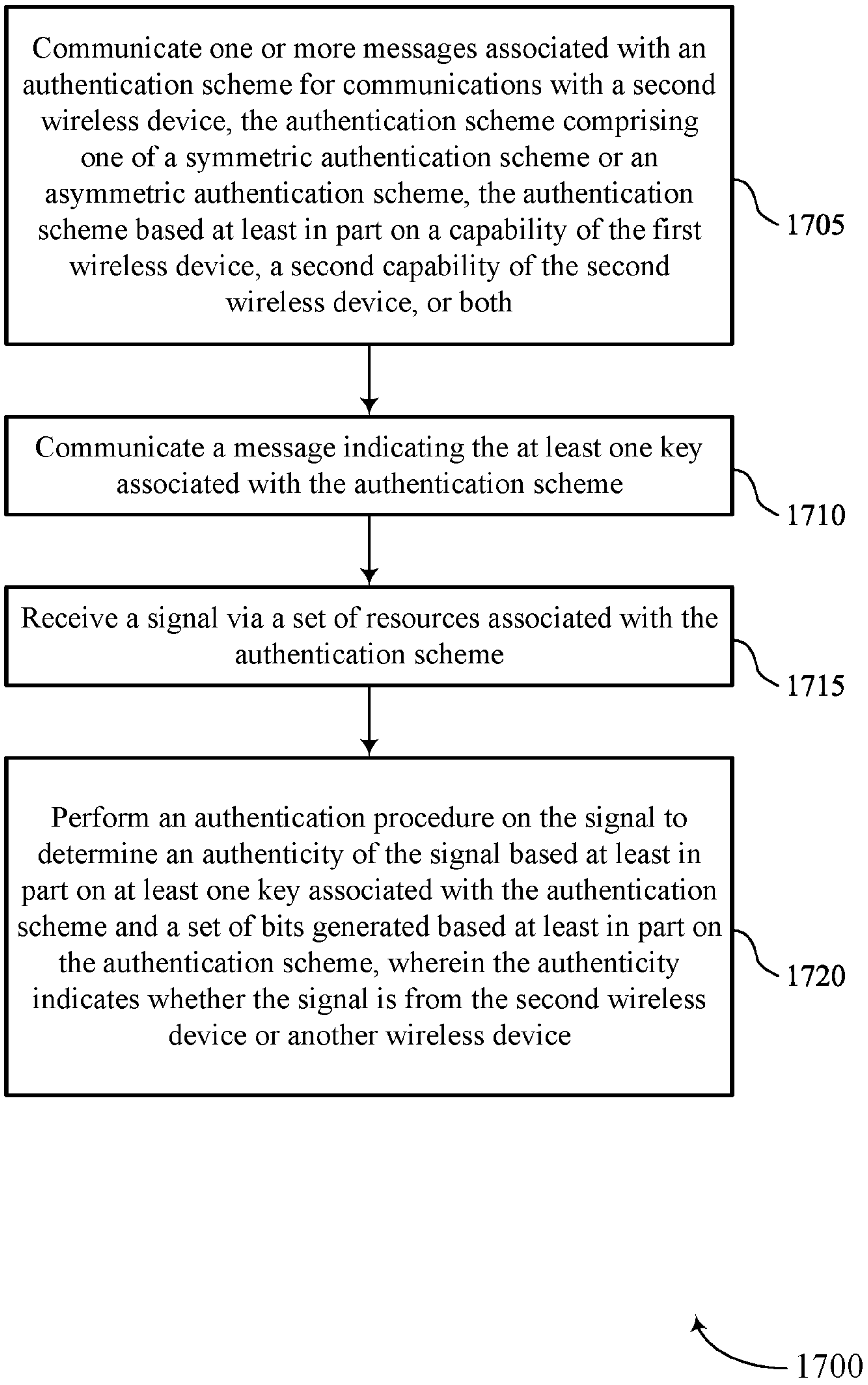

FIG. 17 shows a flowchart illustrating a method 1700 that supports techniques for data authentication in wireless communications systems in accordance with aspects of the present disclosure. The operations of the method 1700 may be implemented by a receiving wireless device (e.g., a UE 115, a network entity 105) or its components as described herein. For example, the operations of the method 1700 may be performed by a wireless device as described with reference to FIGS. 1 through 11. In some examples, a wireless device may execute a set of instructions to control the functional elements of the wireless device to perform the described functions. Additionally or alternatively, the wireless device may perform aspects of the described functions using special-purpose hardware.

At 1705, the method may include communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both. The operations of 1705 may be performed in accordance with examples as disclosed herein. In some examples, aspects of the operations of 1705 may be performed by a scheme component 1025 as described with reference to FIG. 10.

At 1710, the method may include communicating a message indicating the at least one key associated with the authentication scheme. The operations of 1710 may be performed in accordance with examples as disclosed herein.

In some examples, aspects of the operations of 1710 may be performed by a key component 1050 as described with reference to FIG. 10.

At 1715, the method may include receiving a signal via a set of resources associated with the authentication scheme. The operations of 1715 may be performed in accordance with examples as disclosed herein. In some examples, aspects of the operations of 1715 may be performed by a signal component 1030 as described with reference to FIG. 10.

At 1720, the method may include performing an authentication procedure on the signal to determine an authenticity of the signal based on at least one key associated with the authentication scheme and a set of bits generated based on the authentication scheme, where the authenticity indicates whether the signal is from the second wireless device or another wireless device. The operations of 1720 may be performed in accordance with examples as disclosed herein. In some examples, aspects of the operations of 1720 may be performed by an authentication component 1035 as described with reference to FIG. 10.

Figure 18:
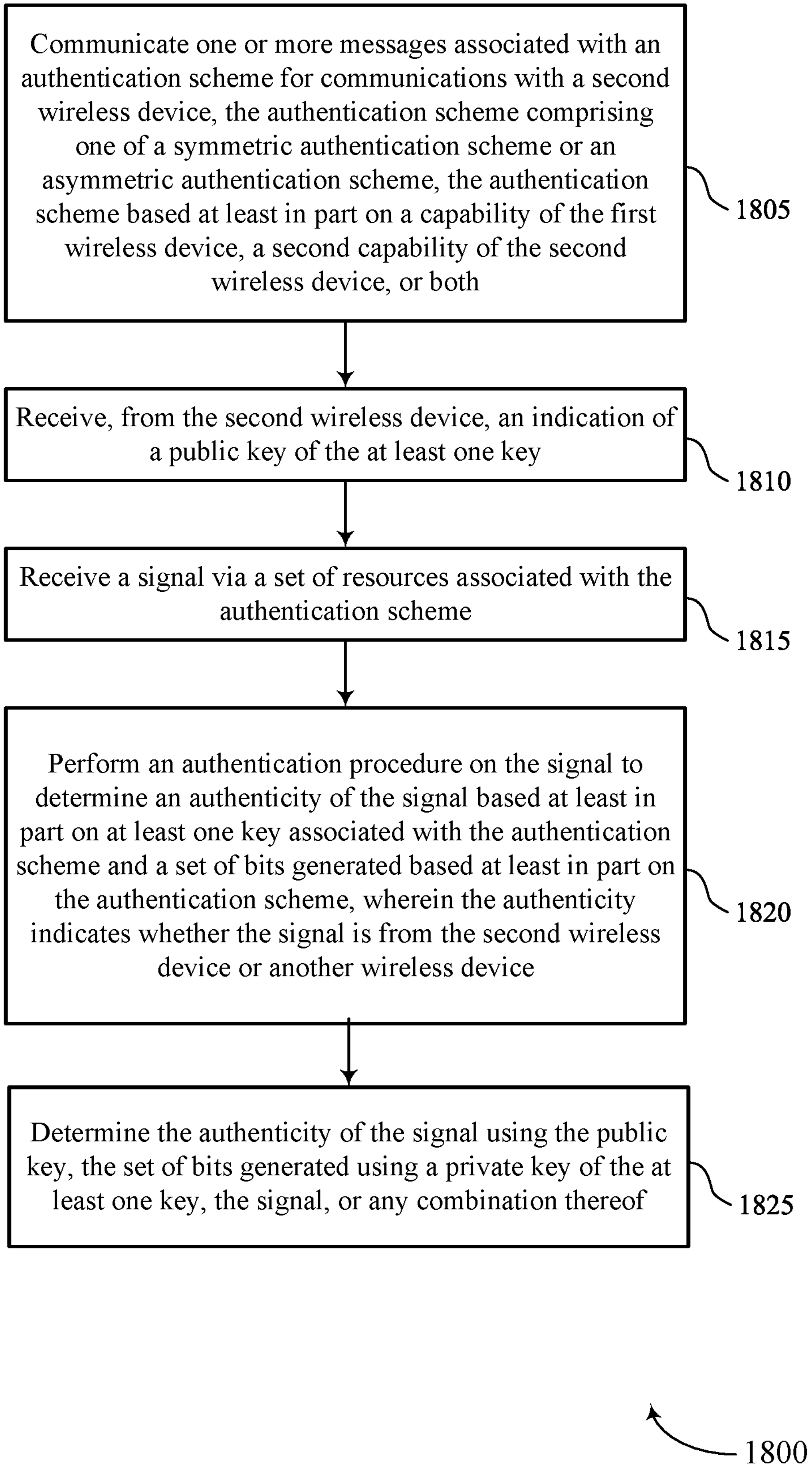

FIG. 18 shows a flowchart illustrating a method 1800 that supports techniques for data authentication in wireless communications systems in accordance with aspects of the present disclosure. The operations of the method 1800 may be implemented by a receiving wireless device (e.g., a UE 115, a network entity 105) or its components as described herein. For example, the operations of the method 1800 may be performed by a wireless device as described with reference to FIGS. 1 through 11. In some examples, a wireless device may execute a set of instructions to control the functional elements of the wireless device to perform the described functions. Additionally or alternatively, the wireless device may perform aspects of the described functions using special-purpose hardware.

At 1805, the method may include communicating one or more messages associated with an authentication scheme for communications with a second wireless device, the authentication scheme including one of a symmetric authentication scheme or an asymmetric authentication scheme, the authentication scheme based on a capability of the first wireless device, a second capability of the second wireless device, or both. The operations of 1805 may be performed in accordance with examples as disclosed herein. In some examples, aspects of the operations of 1805 may be performed by a scheme component 1025 as described with reference to FIG. 10.

At 1810, the method may include receiving, from the second wireless device, an indication of a public key of the at least one key. The operations of 1810 may be performed in accordance with examples as disclosed herein. In some examples, aspects of the operations of 1810 may be performed by a key component 1050 as described with reference to FIG. 10.

At 1815, the method may include receiving a signal via a set of resources associated with the authentication scheme. The operations of 1815 may be performed in accordance with examples as disclosed herein. In some examples, aspects of the operations of 1815 may be performed by a signal component 1030 as described with reference to FIG. 10.

At 1820, the method may include performing an authentication procedure on the signal to determine an authenticity of the signal based on at least one key associated with the authentication scheme and a set of bits generated based on the authentication scheme, where the authenticity indicates whether the signal is from the second wireless device or another wireless device. The operations of 1820 may be performed in accordance with examples as disclosed herein. In some examples, aspects of the operations of 1820 may be performed by an authentication component 1035 as described with reference to FIG. 10.

At 1825, the method may include determining the authenticity of the signal using the public key, the set of bits generated using a private key of the at least one key, the signal, or any combination thereof. The operations of 1825 may be performed in accordance with examples as disclosed herein. In some examples, aspects of the operations of 1825 may be performed by an authentication component 1035 as described with reference to FIG. 10.

Figure 19:
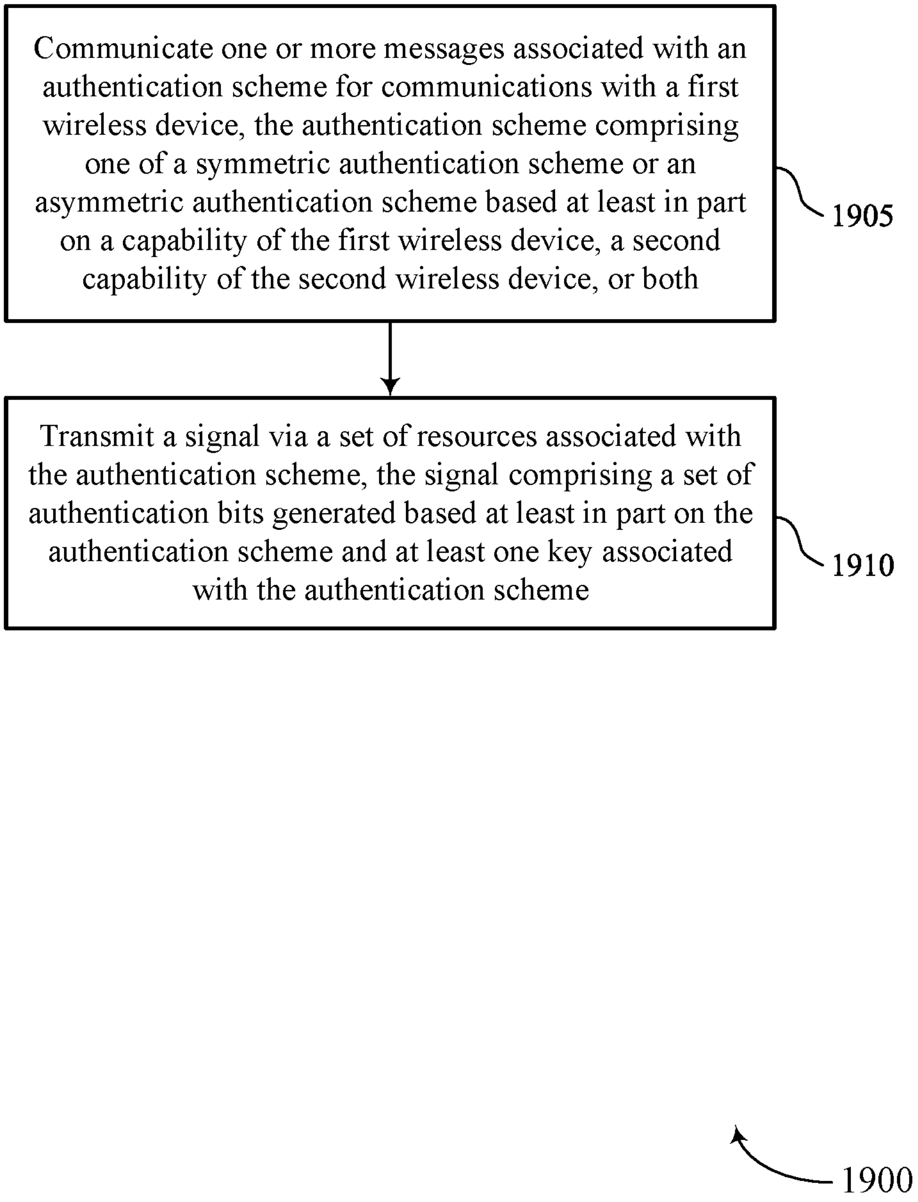

FIG. 19 shows a flowchart illustrating a method 1900 that supports techniques for data authentication in wireless communications systems in accordance with aspects of the present disclosure. The operations of the method 1900 may be implemented by a transmitting wireless device (e.g., a UE 115, a network entity 105) or its components as described herein. For example, the operations of the method 1900 may be performed by a wireless device as described with reference to FIGS. 1 through 7 and 12 through 15. In some examples, a wireless device may execute a set of instructions to control the functional elements of the wireless device to perform the described functions. Additionally or alternatively, the wireless device may perform aspects of the described functions using special-purpose hardware.

At 1905, the method may include communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both. The operations of 1905 may be performed in accordance with examples as disclosed herein. In some examples, aspects of the operations of 1905 may be performed by a scheme module 1425 as described with reference to FIG. 14.

At 1910, the method may include transmitting a signal via a set of resources associated with the authentication scheme, the signal including a set of authentication bits generated based on the authentication scheme and at least one key associated with the authentication scheme. The operations of 1910 may be performed in accordance with examples as disclosed herein. In some examples, aspects of the operations of 1910 may be performed by a signal module 1430 as described with reference to FIG. 14.

Figure 20:
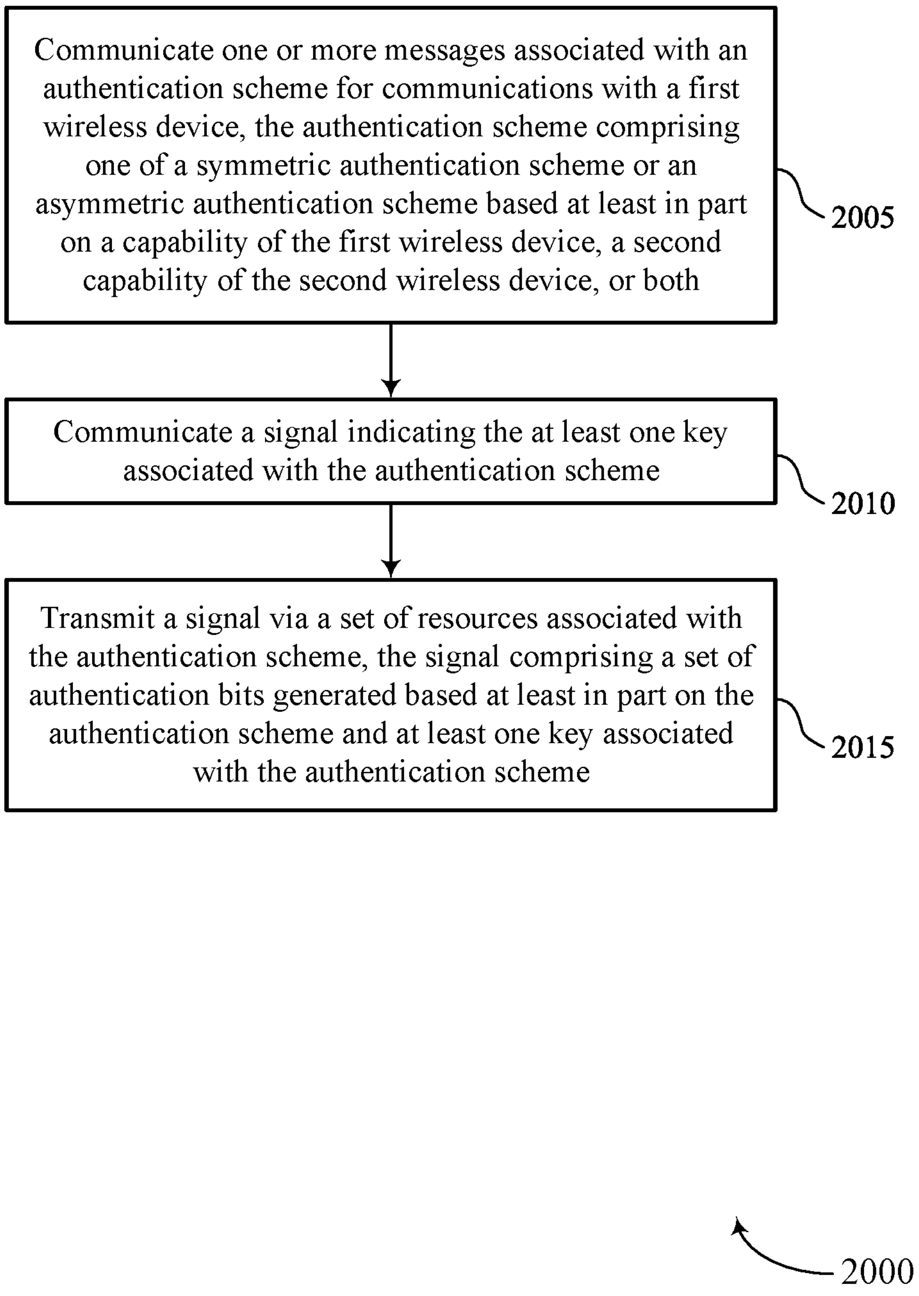

FIG. 20 shows a flowchart illustrating a method 2000 that supports techniques for data authentication in wireless communications systems in accordance with aspects of the present disclosure. The operations of the method 2000 may be implemented by a wireless device (e.g., a UE 115, a network entity 105) or its components as described herein. For example, the operations of the method 2000 may be performed by a wireless device as described with reference to FIGS. 1 through 7 and 12 through 15. In some examples, a wireless device may execute a set of instructions to control the functional elements of the wireless device to perform the described functions. Additionally or alternatively, the wireless device may perform aspects of the described functions using special-purpose hardware.

At 2005, the method may include communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both. The operations of 2005 may be performed in accordance with examples as disclosed herein. In some examples, aspects of the operations of 2005 may be performed by a scheme module 1425 as described with reference to FIG. 14.

At 2010, the method may include communicating a message indicating the at least one key associated with the authentication scheme. The operations of 2010 may be performed in accordance with examples as disclosed herein. In some examples, aspects of the operations of 2010 may be performed by a key module 1445 as described with reference to FIG. 14.

At 2015, the method may include transmitting a signal via a set of resources associated with the authentication scheme, the signal including a set of authentication bits generated based on the authentication scheme and at least one key associated with the authentication scheme. The operations of 2015 may be performed in accordance with examples as disclosed herein. In some examples, aspects of the operations of 2015 may be performed by a signal module 1430 as described with reference to FIG. 14.

Figure 21:
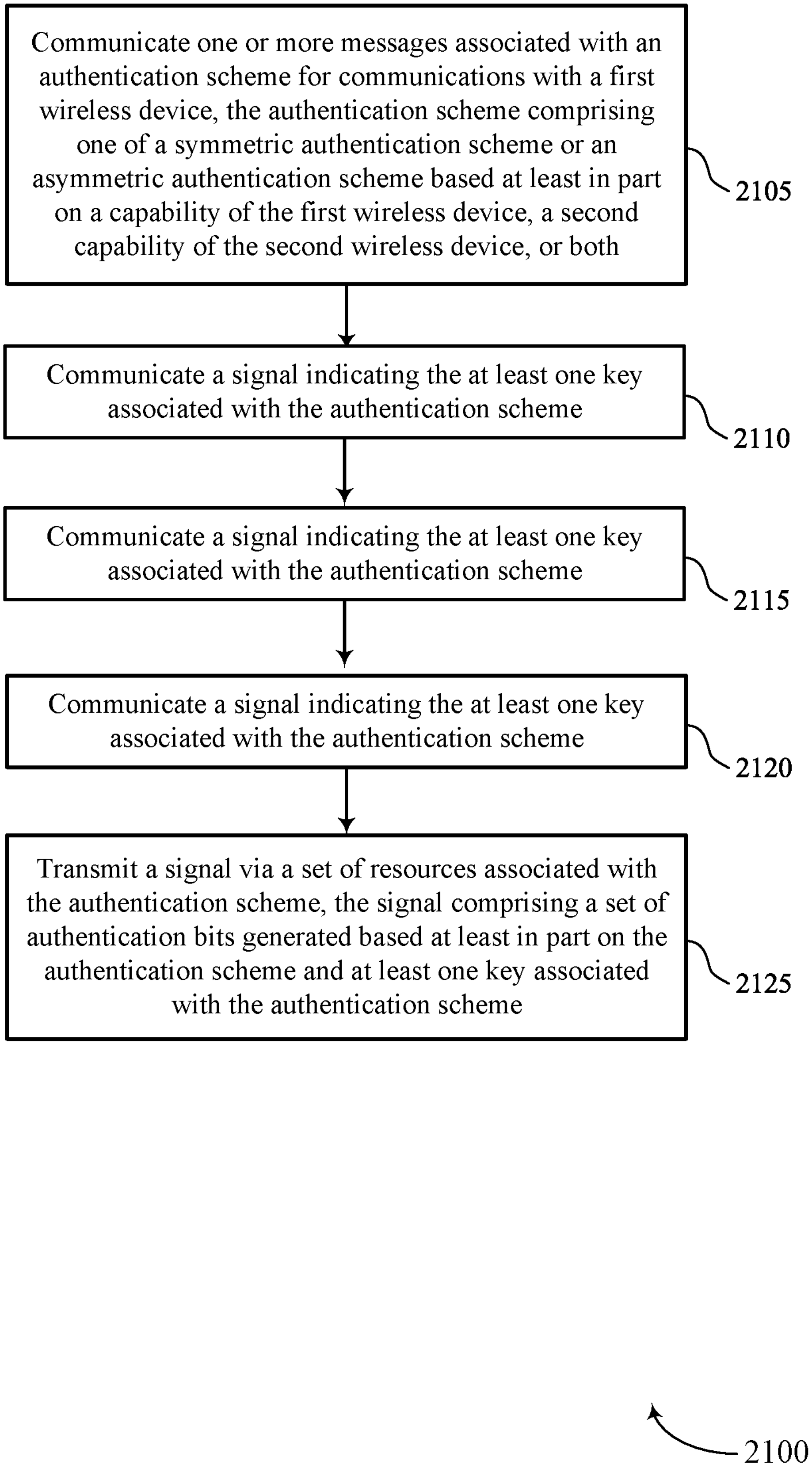

FIG. 21 shows a flowchart illustrating a method 2100 that supports techniques for data authentication in wireless communications systems in accordance with aspects of the present disclosure. The operations of the method 2100 may be implemented by a wireless device (e.g., a UE 115, a network entity 105) or its components as described herein. For example, the operations of the method 2100 may be performed by a wireless device as described with reference to FIGS. 1 through 7 and 12 through 15. In some examples, a wireless device may execute a set of instructions to control the functional elements of the wireless device to perform the described functions. Additionally or alternatively, the wireless device may perform aspects of the described functions using special-purpose hardware.

At 2105, the method may include communicating one or more messages associated with an authentication scheme for communications with a first wireless device, the authentication scheme including one of a symmetric authentication scheme or an asymmetric authentication scheme based on a capability of the first wireless device, a second capability of the second wireless device, or both. The operations of 2105 may be performed in accordance with examples as disclosed herein. In some examples, aspects of the operations of 2105 may be performed by a scheme module 1425 as described with reference to FIG. 14.

At 2110, the method may include generating a public key and a private key of the at least one key associated with the authentication scheme. The operations of 2110 may be performed in accordance with examples as disclosed herein. In some examples, aspects of the operations of 2110 may be performed by a key module 1445 as described with reference to FIG. 14.

At 2115, the method may include transmitting, to the first wireless device, an indication of the public key. The operations of 2110 may be performed in accordance with examples as disclosed herein. In some examples, aspects of the operations of 2110 may be performed by a key module 1445 as described with reference to FIG. 14.

At 2120, the method may include generating the set of authentication bits using the private key, where the set of authentication bits are verifiable using the public key. The operations of 2110 may be performed in accordance with examples as disclosed herein. In some examples, aspects of the operations of 2110 may be performed by a bit generation module 1450 as described with reference to FIG. 14.

At 2125, the method may include transmitting a signal via a set of resources associated with the authentication scheme, the signal including a set of authentication bits generated based on the authentication scheme and at least one key associated with the authentication scheme. The operations of 2115 may be performed in accordance with examples as disclosed herein. In some examples, aspects of the operations of 2115 may be performed by a signal module 1430 as described with reference to FIG. 14.

The following provides an overview of aspects of the present disclosure:

Aspect 1: A method for wireless communications at a first wireless device, comprising: communicating one or more messages associated with an authentication scheme for communications with a second wireless device, the authentication scheme comprising one of a symmetric authentication scheme or an asymmetric authentication scheme, the authentication scheme based at least in part on a capability of the first wireless device, a second capability of the second wireless device, or both; receiving a signal via a set of resources associated with the authentication scheme; and performing an authentication procedure on the signal to determine an authenticity of the signal based at least in part on at least one key associated with the authentication scheme and a set of bits generated based at least in part on the authentication scheme, wherein the authenticity indicates whether the signal is from the second wireless device or another wireless device.

Aspect 2: The method of aspect 1, wherein the authentication scheme comprises the asymmetric authentication scheme, further comprising: receiving, from the second wireless device, an indication of a public key of the at least one key; and determining the authenticity of the signal using the public key, the set of bits generated using a private key of the at least one key, the signal, or any combination thereof.

Aspect 3: The method of aspect 1, wherein communicating the one or more messages comprises: transmitting a capability message indicating the capability of the first wireless device; and receiving, from the second wireless device, a message indicating that the authentication scheme comprises one of the symmetric authentication scheme or the asymmetric authentication scheme based at least in part on the capability of the first wireless device, the capability of the second wireless device, or both.

Aspect 4: The method of any of aspects 1 through 3, further comprising: estimating a channel associated with the set of resources to obtain a channel metric; and deriving the at least one key associated with the authentication scheme based at least in part on the channel metric.

Aspect 5: The method of any of aspects 1 through 4, further comprising: generating the at least one key based at least in part on the authentication scheme, wherein the at least one key comprises a public key and a private key based at least in part on the authentication scheme being the asymmetric authentication scheme; and communicating a message indicating the at least one key with the second wireless device.

Aspect 6: The method of any of aspects 1 through 5, wherein communicating the one or more messages comprises: receiving a message from the second wireless device configuring the authentication scheme for one or more resource pools, wherein the set of resources comprises a subset of the one or more resource pools.

Aspect 7: The method of any of aspects 1 through 6, wherein performing the authentication procedure comprises: generating the set of bits using the at least one key associated with the authentication scheme and using the signal; comparing the generated set of bits to a set of authentication bits included in the signal; and determining the authenticity of the signal based at least in part on the comparison.

Aspect 8: The method of aspect 7, wherein the set of authentication bits are based at least in part on a mode of operation; and a size of the set of authentication bits corresponds to the mode of operation, a security level indicated by the one or more messages, or any combination thereof.

Aspect 9: The method of any of aspects 7 through 8, wherein the set of authentication bits, the generated set of bits, or both are based at least in part on one or more code blocks of the signal, one or more error detection bits of the signal, one or more identifiers, or any combination thereof.

Aspect 10: The method of any of aspects 1 through 9, further comprising: communicating a message indicating the at least one key associated with the authentication scheme.

Aspect 11: The method of aspect 10, wherein communicating the message comprises: communicating the message indicating the at least one key via layer 1 signaling, layer 2 signaling, layer 3 signaling, or any combination thereof.

Aspect 12: The method of any of aspects 10 through 11, wherein communicating the message comprises: communicating the message via a secure channel.

Aspect 13: The method of any of aspects 1 through 12, wherein a set of authentication bits included in the signal are jointly encoded with one or more code blocks and error detection bits of the signal; or the set of authentication bits included in the signal are appended to encoded bits of the signal, the encoded bits indicating the one or more code blocks, the error detection bits, or a combination thereof.

Aspect 14: The method of any of aspects 1 through 13, wherein a set of authentication bits included in the signal corresponds to a group of code blocks of the signal.

Aspect 15: The method of any of aspects 1 through 14, further comprising: communicating a set of signals prior to receiving the signal, wherein the set of bits are generated based at least in part on successful decoding of the set of signals.

Aspect 16: The method of aspect 15, further comprising: receiving an indication of a set of code blocks or a set of transport blocks of the set of signals, wherein the set of bits are generated based at least in part on the indication; or selecting the set of code blocks or the set of transport blocks of the set of signals based at least in part on the at least one key, wherein the set of bits are generated based at least in part on the selecting.

Aspect 17: A method for wireless communications at a second wireless device, comprising: communicating one or more messages associated with an authentication scheme for communications with a first wireless device, the authentication scheme comprising one of a symmetric authentication scheme or an asymmetric authentication scheme based at least in part on a capability of the first wireless device, a second capability of the second wireless device, or both; and transmitting a signal via a set of resources associated with the authentication scheme, the signal comprising a set of authentication bits generated based at least in part on the authentication scheme and at least one key associated with the authentication scheme.

Aspect 18: The method of aspect 17, wherein the authentication scheme comprises the asymmetric authentication scheme, further comprising: generating a public key and a private key of the at least one key associated with the authentication scheme; transmitting, to the first wireless device, an indication of the public key; and generating the set of authentication bits using the private key, wherein the set of authentication bits are verifiable using the public key.

Aspect 19: The method of aspect 17, wherein communicating the one or more messages comprises: receiving a capability message indicating the capability of the first wireless device; and transmitting, to the second wireless device, a message indicating that the authentication scheme comprises one of the symmetric authentication scheme or the asymmetric authentication scheme based at least in part on the capability of the first wireless device, the capability of the second wireless device, or both.

Aspect 20: The method of any of aspects 17 through 19, further comprising: estimating a channel associated with the set of resources to obtain a channel metric; and deriving the at least one key associated with the authentication scheme based at least in part on the channel metric.

Aspect 21: The method of any of aspects 17 through 20, further comprising: communicating a message indicating the at least one key with the first wireless device, wherein the at least one key comprises a public key and a private key based at least in part on the authentication scheme being the asymmetric authentication scheme.

Aspect 22: The method of any of aspects 17 through 21, wherein communicating the one or more messages comprises: transmitting a message to the first wireless device configuring the authentication scheme for one or more resource pools, wherein the set of resources comprise a subset of the one or more resource pools.

Aspect 23: The method of any of aspects 17 through 22, wherein further comprising: generating the set of authentication bits using the at least one key associated with the authentication scheme and using the signal, wherein the set of authentication bits are based at least in part on a mode of operation, a security level indicated by the one or more messages, one or more code blocks of the signal, one or more error detection bits of the signal, one or more identifiers, or any combination thereof.

Aspect 24: The method of any of aspects 17 through 23, further comprising: jointly encoding the set of authentication bits with one or more code blocks and error detection bits of the signal; or appending the set of authentication bits to encoded bits of the signal, the encoded bits indicating the one or more code blocks and the error detection bits.

Aspect 25: The method of any of aspects 17 through 24, further comprising: communicating a set of signals prior to receiving the signal, wherein the set of authentication bits are generated based at least in part on successful decoding of the set of signals.

Aspect 26: The method of aspect 25, further comprising: receiving an indication of a set of code blocks or a set of transport blocks of the set of signals, wherein the set of authentication bits are generated based at least in part on the indication; or selecting the set of code blocks or the set of transport blocks of the set of signals based at least in part on the at least one key, wherein the set of authentication bits are generated based at least in part on the selecting.

Aspect 27: The method of any of aspects 17 through 26, further comprising: communicating a message indicating the at least one key associated with the authentication scheme.

Aspect 28: The method of aspect 27, wherein communicating the message comprises: communicating the message indicating the at least one key via layer 1 signaling, layer 2 signaling, layer 3 signaling, or any combination thereof.

Aspect 29: The method of any of aspects 27 through 28, wherein communicating the message comprises: communicating the message via a secure channel.

Aspect 30: An apparatus for wireless communications at a first wireless device, comprising a processor; memory coupled with the processor; and instructions stored in the memory and executable by the processor to cause the apparatus to perform a method of any of aspects 1 through 16.

Aspect 31: An apparatus for wireless communications at a first wireless device, comprising at least one means for performing a method of any of aspects 1 through 16.

Aspect 32: A non-transitory computer-readable medium storing code for wireless communications at a first wireless device, the code comprising instructions executable by a processor to perform a method of any of aspects 1 through 16.

Aspect 33: An apparatus for wireless communications at a second wireless device, comprising a processor; memory coupled with the processor; and instructions stored in the memory and executable by the processor to cause the apparatus to perform a method of any of aspects 17 through 29.

Aspect 34: An apparatus for wireless communications at a second wireless device, comprising at least one means for performing a method of any of aspects 17 through 29.

Aspect 35: A non-transitory computer-readable medium storing code for wireless communications at a second wireless device, the code comprising instructions executable by a processor to perform a method of any of aspects 17 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:

communicating one or more messages associated with an authentication scheme for communications with a second wireless device, the authentication scheme comprising one of a symmetric authentication scheme or an asymmetric authentication scheme, the authentication scheme based at least in part on a capability of the first wireless device, a second capability of the second wireless device, or both;

receiving a signal via a set of resources associated with the authentication scheme; and performing an authentication procedure on the signal to determine an authenticity of the signal based at least in part on at least one key associated with the authentication scheme and a set of bits generated based at least in part on the authentication scheme, wherein the authenticity indicates whether the signal is from the second wireless device or another wireless device.

2. The method of claim 1, wherein the authentication scheme comprises the asymmetric authentication scheme, further comprising:

receiving, from the second wireless device, an indication of a public key of the at least one key; and determining the authenticity of the signal using the public key, the set of bits generated using a private key of the at least one key, the signal, or any combination thereof.

3. The method of claim 1, wherein communicating the one or more messages comprises:

transmitting a capability message indicating the capability of the first wireless device; and receiving, from the second wireless device, a message indicating that the authentication scheme comprises one of the symmetric authentication scheme or the asymmetric authentication scheme based at least in part on the capability of the first wireless device, the capability of the second wireless device, or both.

4. The method of claim 1, further comprising:

estimating a channel associated with the set of resources to obtain a channel metric; and deriving the at least one key associated with the authentication scheme based at least in part on the channel metric.

5. The method of claim 1, further comprising:

generating the at least one key based at least in part on the authentication scheme, wherein the at least one key comprises a public key and a private key based at least in part on the authentication scheme being the asymmetric authentication scheme; and communicating a message indicating the at least one key with the second wireless device.

6. The method of claim 1, wherein communicating the one or more messages comprises:

receiving a message from the second wireless device configuring the authentication scheme for one or more resource pools, wherein the set of resources comprises a subset of the one or more resource pools.

7. The method of claim 1, wherein performing the authentication procedure comprises:

generating the set of bits using the at least one key associated with the authentication scheme and using the signal;

comparing the generated set of bits to a set of authentication bits included in the signal; and determining the authenticity of the signal based at least in part on the comparison.

8. The method of claim 7, wherein:

the set of authentication bits are based at least in part on a mode of operation; and a size of the set of authentication bits corresponds to the mode of operation, a security level indicated by the one or more messages, or any combination thereof.

9. The method of claim 7, wherein the set of authentication bits, the generated set of bits, or both are based at least in part on one or more code blocks of the signal, one or more error detection bits of the signal, one or more identifiers, or any combination thereof.

10. The method of claim 1, further comprising:

communicating a message indicating the at least one key associated with the authentication scheme.

11. The method of claim 10, wherein communicating the message comprises:

communicating the message indicating the at least one key via layer 1 signaling, layer 2 signaling, layer 3 signaling, a secure channel, or any combination thereof.

12. The method of claim 1, wherein:

a set of authentication bits included in the signal are jointly encoded with one or more code blocks and error detection bits of the signal; or the set of authentication bits included in the signal are appended to encoded bits of the signal, the encoded bits indicating the one or more code blocks, the error detection bits, or a combination thereof.

13. The method of claim 1, wherein a set of authentication bits included in the signal corresponds to a group of code blocks of the signal.

14. The method of claim 1, further comprising:

communicating a set of signals prior to receiving the signal, wherein the set of bits are generated based at least in part on successful decoding of the set of signals.

15. The method of claim 14, further comprising:

receiving an indication of a set of code blocks or a set of transport blocks of the set of signals, wherein the set of bits are generated based at least in part on the indication; or selecting the set of code blocks or the set of transport blocks of the set of signals based at least in part on the at least one key, wherein the set of bits are generated based at least in part on the selecting.

16. A method for wireless communications at a second wireless device, comprising:

receiving a capability message indicating a capability of a first wireless device;

transmitting, to the first wireless device, a message indicating an authentication scheme comprising one of a symmetric authentication scheme or an asymmetric authentication scheme based at least in part on the capability of the first wireless device, a capability of the second wireless device, or both;

communicating one or more messages associated with the authentication scheme for communications with the first wireless device; and transmitting a signal via a set of resources associated with the authentication scheme, the signal comprising a set of authentication bits generated based at least in part on the authentication scheme and at least one key associated with the authentication scheme.

17. The method of claim 16, wherein the authentication scheme comprises the asymmetric authentication scheme, further comprising:

generating a public key and a private key of the at least one key associated with the authentication scheme;

transmitting, to the first wireless device, an indication of the public key; and generating the set of authentication bits using the private key, wherein the set of authentication bits are verifiable using the public key.

18. The method of claim 16, further comprising:

estimating a channel associated with the set of resources to obtain a channel metric; and deriving the at least one key associated with the authentication scheme based at least in part on the channel metric.

19. The method of claim 16, further comprising:

communicating a message indicating the at least one key with the first wireless device, wherein the at least one key comprises a public key and a private key based at least in part on the authentication scheme being the asymmetric authentication scheme.

20. The method of claim 16, wherein communicating the one or more messages comprises:

transmitting a message to the first wireless device configuring the authentication scheme for one or more resource pools, wherein the set of resources comprise a subset of the one or more resource pools.

21. The method of claim 16, further comprising:

generating the set of authentication bits using the at least one key associated with the authentication scheme and using the signal, wherein the set of authentication bits are based at least in part on a mode of operation, a security level indicated by the one or more messages, one or more code blocks of the signal, one or more error detection bits of the signal, one or more identifiers, or any combination thereof.

22. The method of claim 16, further comprising:

jointly encoding the set of authentication bits with one or more code blocks and error detection bits of the signal; or appending the set of authentication bits to encoded bits of the signal, the encoded bits indicating the one or more code blocks and the error detection bits.

23. The method of claim 16, further comprising:

communicating a set of signals prior to receiving the signal, wherein the set of authentication bits are generated based at least in part on successful decoding of the set of signals.

24. The method of claim 23, further comprising:

receiving an indication of a set of code blocks or a set of transport blocks of the set of signals, wherein the set of authentication bits are generated based at least in part on the indication; or selecting the set of code blocks or the set of transport blocks of the set of signals based at least in part on the at least one key, wherein the set of authentication bits are generated based at least in part on the selecting.

25. The method of claim 16, further comprising:

communicating a message indicating the at least one key associated with the authentication scheme.

26. The method of claim 25, wherein communicating the message comprises:

communicating the message indicating the at least one key via layer 1 signaling, layer 2 signaling, layer 3 signaling, a secure channel, or any combination thereof.

27. An apparatus for wireless communications at a first wireless device, comprising:

a processor;

memory coupled with the processor; and instructions stored in the memory, wherein the instructions are executable by the processor to:

communicate one or more messages associated with an authentication scheme for communications with a second wireless device, the authentication scheme comprising one of a symmetric authentication scheme or an asymmetric authentication scheme, the authentication scheme based at least in part on a capability of the first wireless device, a second capability of the second wireless device, or both;

receive a signal via a set of resources associated with the authentication scheme; and perform an authentication procedure on the signal to determine an authenticity of the signal based at least in part on at least one key associated with the authentication scheme and a set of bits generated based at least in part on the authentication scheme, wherein the authenticity indicates whether the signal is from the second wireless device or another wireless device.

28. The apparatus of claim 27, wherein the instructions executable by the processor to communicate the one or more messages comprise instructions executable by the processor to cause the processor to:

transmit a capability message indicating the capability of the first wireless device; and receive, from the second wireless device, a message indicating that the authentication scheme comprises one of the symmetric authentication scheme or the asymmetric authentication scheme based at least in part on the capability of the first wireless device, the capability of the second wireless device, or both.

29. An apparatus for wireless communications at a second wireless device, comprising:

a processor;

memory coupled with the processor; and instructions stored in the memory, wherein the instructions are executable by the processor to:

receive a capability message indicating a capability of a first wireless device;

transmit, to the first wireless device, a message indicating an authentication scheme comprising one of a symmetric authentication scheme or an asymmetric authentication scheme based at least in part on the capability of the first wireless device, a capability of the second wireless device, or both;

communicate one or more messages associated with the authentication scheme for communications with the first wireless device; and transmit a signal via a set of resources associated with the authentication scheme, the signal comprising a set of authentication bits generated based at least in part on the authentication scheme and at least one key associated with the authentication scheme.

* * * * *